(12) United States Patent
Back et al.

(10) Patent No.: US 12,177,818 B2
(45) Date of Patent: Dec. 24, 2024

(54) METHOD FOR TRANSMITTING SIDELINK SIGNAL IN WIRELESS COMMUNICATION SYSTEM

(71) Applicant: LG ELECTRONICS INC., Seoul (KR)

(72) Inventors: Seoyoung Back, Seoul (KR); Seungmin Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 406 days.

(21) Appl. No.: 17/614,933

(22) PCT Filed: Jul. 30, 2020

(86) PCT No.: PCT/KR2020/010066
§ 371 (c)(1),
(2) Date: Nov. 29, 2021

(87) PCT Pub. No.: WO2021/020904
PCT Pub. Date: Feb. 4, 2021

(65) Prior Publication Data
US 2022/0232542 A1 Jul. 21, 2022

(30) Foreign Application Priority Data
Jul. 30, 2019 (KR) .................. 10-2019-0092713

(51) Int. Cl.
*H04W 72/044* (2023.01)
*H04L 27/26* (2006.01)
(Continued)

(52) U.S. Cl.
CPC ..... *H04W 72/044* (2013.01); *H04L 27/26025* (2021.01); *H04L 27/2607* (2013.01);
(Continued)

(58) Field of Classification Search
CPC . H04W 72/044; H04W 72/20; H04W 72/542; H04W 4/40; H04W 72/0453;
(Continued)

(56) References Cited

U.S. PATENT DOCUMENTS

2019/0045491 A1* 2/2019 Zhang ................ H04W 72/232
2019/0254110 A1* 8/2019 He ...................... H04L 41/0896

FOREIGN PATENT DOCUMENTS

KR 1020190086043 A 7/2019

OTHER PUBLICATIONS

Intel Corporation, "Sidelink Physical Layer Structure and Procedures for NR V2X Communication", 3GPP TSG RAN WG1 Meeting #95, Nov. 12-16, 2018, R1-1812488.
(Continued)

*Primary Examiner* — Hardikkumar D Patel
(74) *Attorney, Agent, or Firm* — BRYAN CAVE LEIGHTON PAISNER LLP

(57) ABSTRACT

According to an aspect of the present disclosure, a method of a user equipment in a wireless communication system comprises: receiving a plurality of configured bandwidth parts (BWPs) defined on the basis of different numerologies; receiving a discovery signal on each of at least two active BWPs among the plurality of BWPs; transmitting information on one active BWP selected from among the at least two active BWPs; and transmitting a sidelink control signal and a sidelink data signal on the selected one active BWP, wherein the at least two active BWPs are activated concurrently in a time domain, and the selected one active BWP is selected on the basis of a length of a cyclic prefix (CP) of the discovery signal and a point in time at which the discovery signal is received.

14 Claims, 28 Drawing Sheets

(51) Int. Cl.
*H04W 72/20* (2023.01)
*H04W 72/542* (2023.01)
*H04W 4/40* (2018.01)

(52) U.S. Cl.
CPC ......... *H04W 72/20* (2023.01); *H04W 72/542* (2023.01); *H04W 4/40* (2018.02)

(58) Field of Classification Search
CPC ............. H04W 48/08; H04L 27/26025; H04L 27/2607; H04L 5/0026; H04L 5/0064; H04L 5/001; H04L 5/0033; H04L 5/0048; H04L 5/0092; H04L 27/261
See application file for complete search history.

(56) References Cited

OTHER PUBLICATIONS

LG Electronics, "Summary #2 on wide-band operation for NR-U", 3GPP TSG RAN WG1 #97, May 13-17, 2019, R1-1907769.
Vivo, "Discussion on the support of multiple active BWP", 3GPP TSG-RAN WG2 Meeting #103bis, Oct. 8-12, 2018, R2-1814271.
Zte, Sanechips, "Overall consideration on NR V2X resource allocation", 3GPP TSG-RAN WG2 #104, Nov. 12-16, 2018, R2-1816981.
International Search Report from PCT/KR2020/010066, dated Nov. 16, 2020.
Written Opinion of the ISA from PCT/KR2020/010066, dated Nov. 16, 2020.

* cited by examiner (a)

(b)

(a)

(b)

(a)  (b)

METHOD FOR TRANSMITTING SIDELINK SIGNAL IN WIRELESS COMMUNICATION SYSTEM

This application is the National Stage filing under 35 U.S.C. 371 of International Application No. PCT/KR2020/010066 filed on Jul. 30, 2020, which claims priority to Korean Patent Application No. 10-2019-0092713 filed on Jul. 30, 2019, the contents of which are all hereby incorporated by reference herein in their entirety.

TECHNICAL FIELD

The present disclosure relates to a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system and a multi carrier frequency division multiple access (MC-FDMA) system, and so on.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

Various embodiments of the present disclosure may provide a method of transmitting and receiving a signal and an apparatus supporting the same in a wireless communication system.

Specifically, various embodiments of the present disclosure may provide a method of transmitting a sidelink signal and an apparatus supporting the same, which mitigate inter-carrier interference (ICI)/inter-symbol interference (ISI) caused by a shortened cyclic prefix (CP) in a millimeter wave (mmWave) band by selectively using one of a plurality of bandwidth parts (BWPs) in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

Various embodiments of the present disclosure may provide a method of transmitting and receiving a signal and an apparatus supporting the same in a wireless communication system.

According to an aspect of the present disclosure, A method of a user equipment (UE) in a wireless communication system includes being configured with a plurality of bandwidth parts (BWPs) defined based on different numerologies, receiving a discovery signal in each of at least two active BWPs among the plurality of BWPs, transmitting information about one active BWP selected from among the at least two active BWPs, and transmitting a sidelink control signal and a sidelink data signal in the selected one active BWP. The at least two active BWPs are activated simultaneously in a time domain, and the selected one active BWP is selected based on reception times of the discovery signals and the lengths of cyclic prefixes (CPs) in the discovery signals.

The at least two active BWPs may include a first BWP configured to be used only with a normal CP and a second BWP configured to be used only with an extended CP, and based on the reception times of the discovery signals not being included in the length of the normal CP, the selected one active BWP may be the second BWP.

Based on the reception times of the discovery signals being included in the lengths of both of the normal CP and the extended CP, the selected one active BWP may be the first BWP.

The selected one active BWP may be selected UE-specifically.

Information about the selected one active BWP may be transmitted in the second BWP.

The information about the selected one active BWP may be transmitted in a BWP in which a discovery signal having one of a highest received signal strength indication (RSSI) measurement, a highest reference signal received power (RSRP) measurement, and a highest reference signal received quality (RSRQ) measurement has been transmitted, among the at least two active BWPs.

According to another aspect of the present disclosure, an apparatus for a UE in a wireless communication system includes at least one processor, and at least one memory operably coupled to the at least one processor and storing at least one instruction which causes the at least one processor to perform operations. The operations include being configured with a plurality of BWPs defined based on different numerologies, receiving a discovery signal in each of at least two active BWPs among the plurality of BWPs, transmitting information about one active BWP selected from among the at least two active BWPs, and transmitting a sidelink control signal and a sidelink data signal in the selected one active BWP. The at least two active BWPs are activated simultaneously in a time domain, and the selected one active BWP is selected based on reception times of the discovery signals and the lengths of CPs in the discovery signals.

The at least two active BWPs may include a first BWP configured to be used only with a normal CP and a second BWP configured to be used only with an extended CP, and based on the reception times of the discovery signals not being included in the length of the normal CP, the selected one active BWP may be the second BWP.

Based on the reception times of the discovery signals being included in the lengths of both of the normal CP and the extended CP, the selected one active BWP may be the first BWP.

The selected one active BWP may be selected UE-specifically.

Information about the selected one active BWP may be transmitted in the second BWP.

The UE may be an autonomous driving vehicle or may be included in an autonomous driving vehicle.

According to another aspect of the present disclosure, a processor for performing operations for a UE in a wireless communication system is provided. The operations include being configured with a plurality of BWPs defined based on different numerologies, receiving a discovery signal in each of at least two active BWPs among the plurality of BWPs, transmitting information about one active BWP selected from among the at least two active BWPs, and transmitting a sidelink control signal and a sidelink data signal in the selected one active BWP. The at least two active BWPs are activated simultaneously in a time domain, and the selected one active BWP is selected based on reception times of the discovery signals and the lengths of CPs in the discovery signals.

According to another aspect of the present disclosure, a computer-readable storage medium storing at least one instruction which, when executed by at least one processor, causes the at least one processor to perform operations for a UE is provided. The operations include being configured with a plurality of BWPs defined based on different numerologies, receiving a discovery signal in each of at least two active BWPs among the plurality of BWPs, transmitting information about one active BWP selected from among the at least two active BWPs, and transmitting a sidelink control signal and a sidelink data signal in the selected one active BWP. The at least two active BWPs are activated simultaneously in a time domain, and the selected one active BWP is selected based on reception times of the discovery signals and the lengths of CPs in the discovery signals.

The above-described aspects of the present disclosure are merely some of the preferred embodiments of the present disclosure, and various embodiments reflecting the technical features of the present disclosure may be derived and understood by those skilled in the art based on the following detailed description of the disclosure.

Advantageous Effects

The embodiments of the present disclosure have the following effects.

According to various embodiments of the present disclosure, a method of transmitting a sidelink signal and an apparatus supporting the same may be provided, which mitigate inter-carrier interference (ICI)/inter-symbol interference (ISI) caused by a shortened cyclic prefix (CP) in a millimeter wave (mmWave) band by selectively using one of a plurality of bandwidth parts (BWPs) in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (OFDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
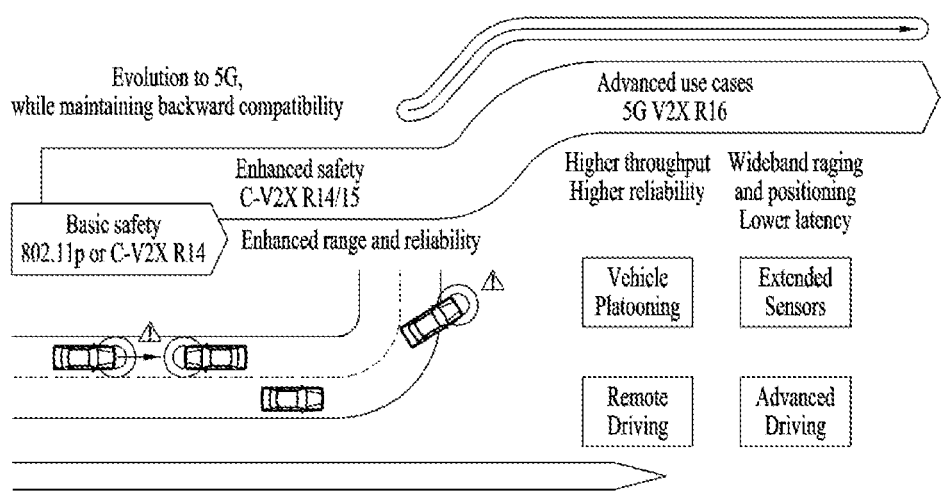
FIG. 1 is a diagram illustrating vehicle-to-everything (V2X) communication based on pre-new radio access technology (NR) RAT and V2X communication based on NR in comparison.
Figure 2:
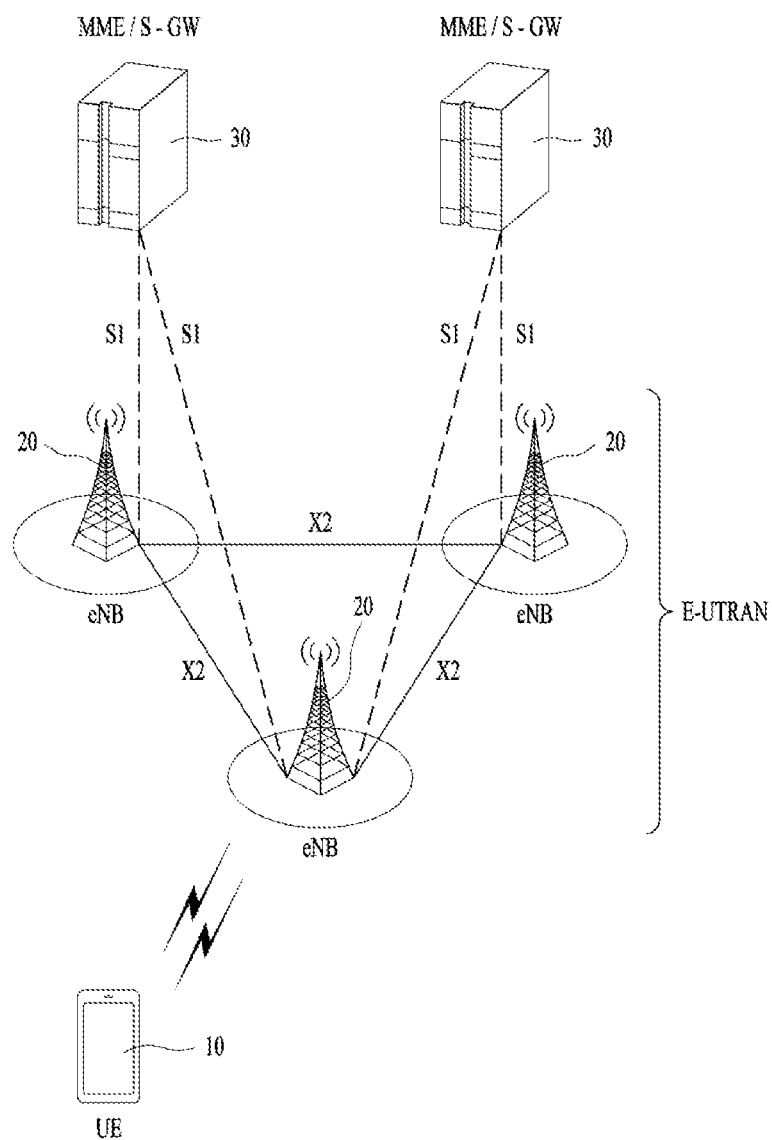
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
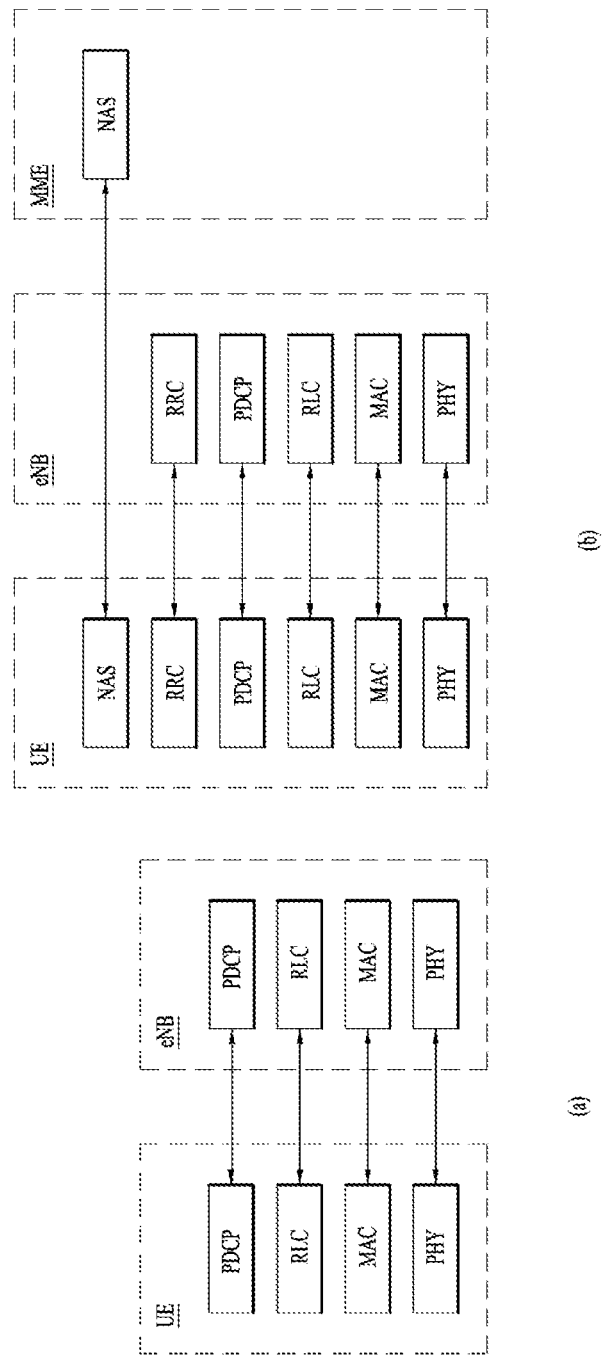
FIG. 3 is a diagram illustrating user-plane and control-plane radio protocol architectures according to an embodiment of the present disclosure.

FIG. 3(a) illustrates a user-plane radio protocol architecture according to an embodiment of the disclosure.

FIG. 3(b) illustrates a control-plane radio protocol architecture according to an embodiment of the disclosure. A user plane is a protocol stack for user data transmission, and a control plane is a protocol stack for control signal transmission.

Referring to FIGS. 3(a) and 3(b), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel A transmission time interval (TTI) is a unit time for subframe transmission.

Figure 4:
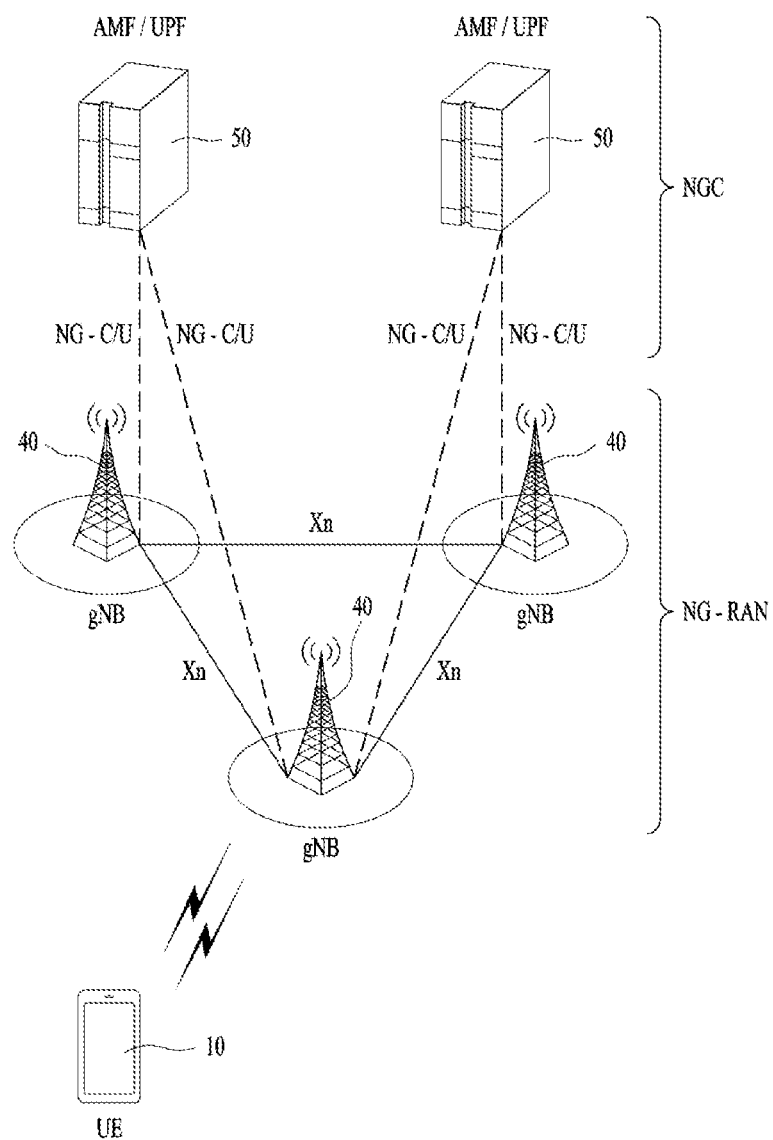
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
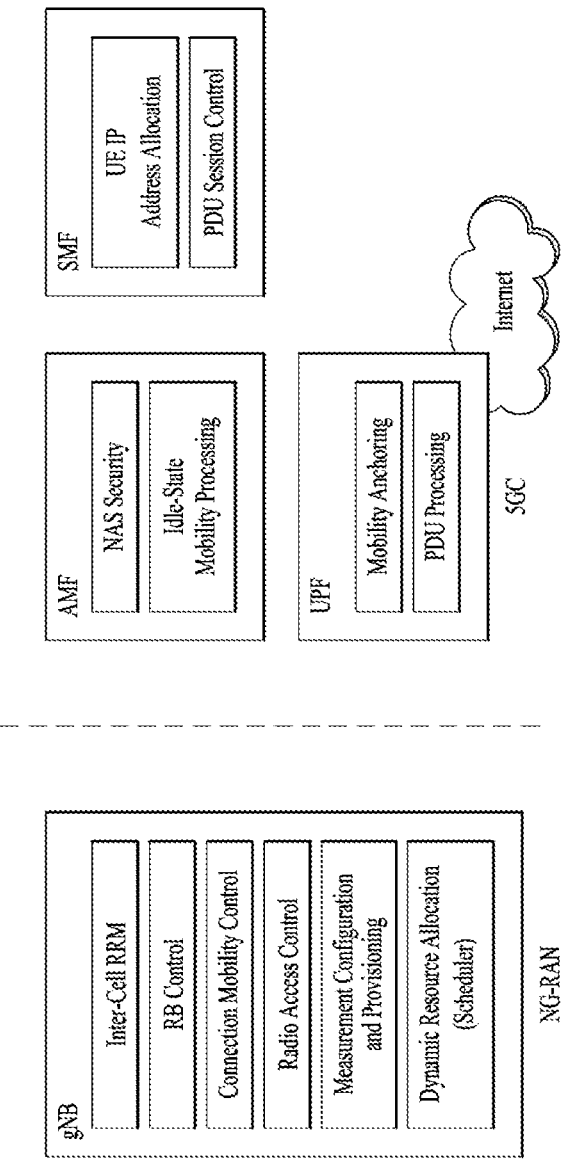
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
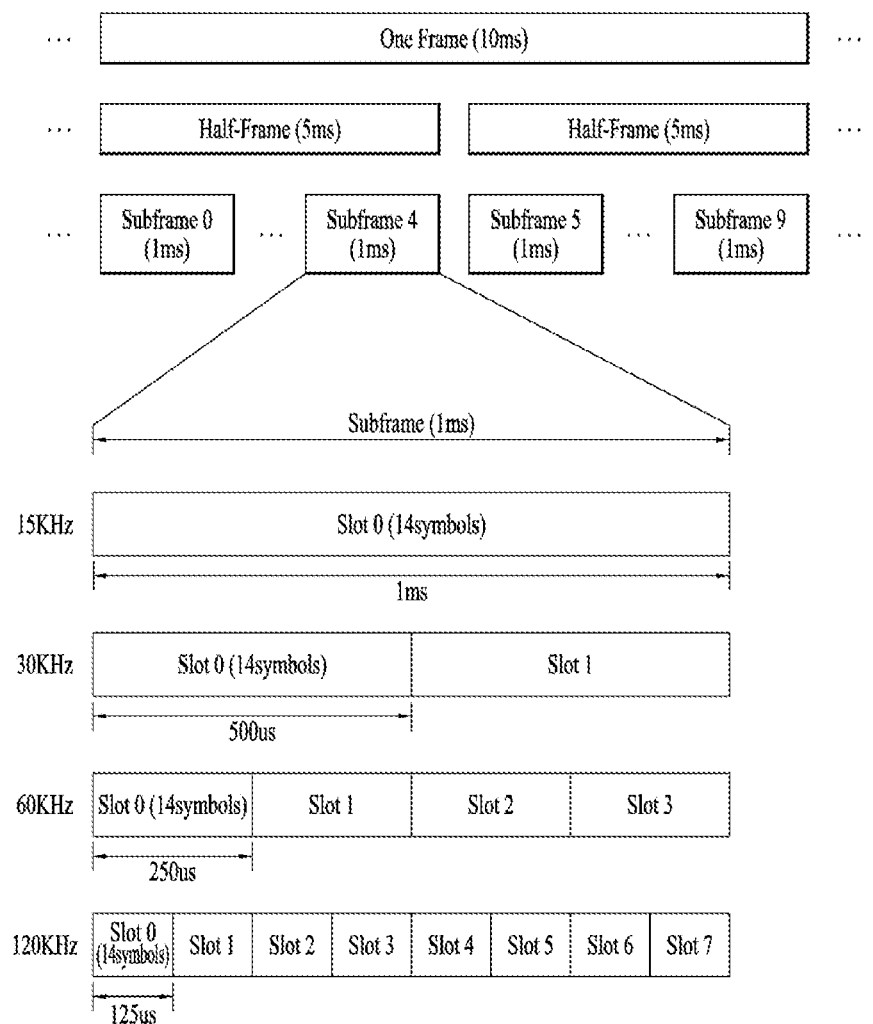
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5 G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
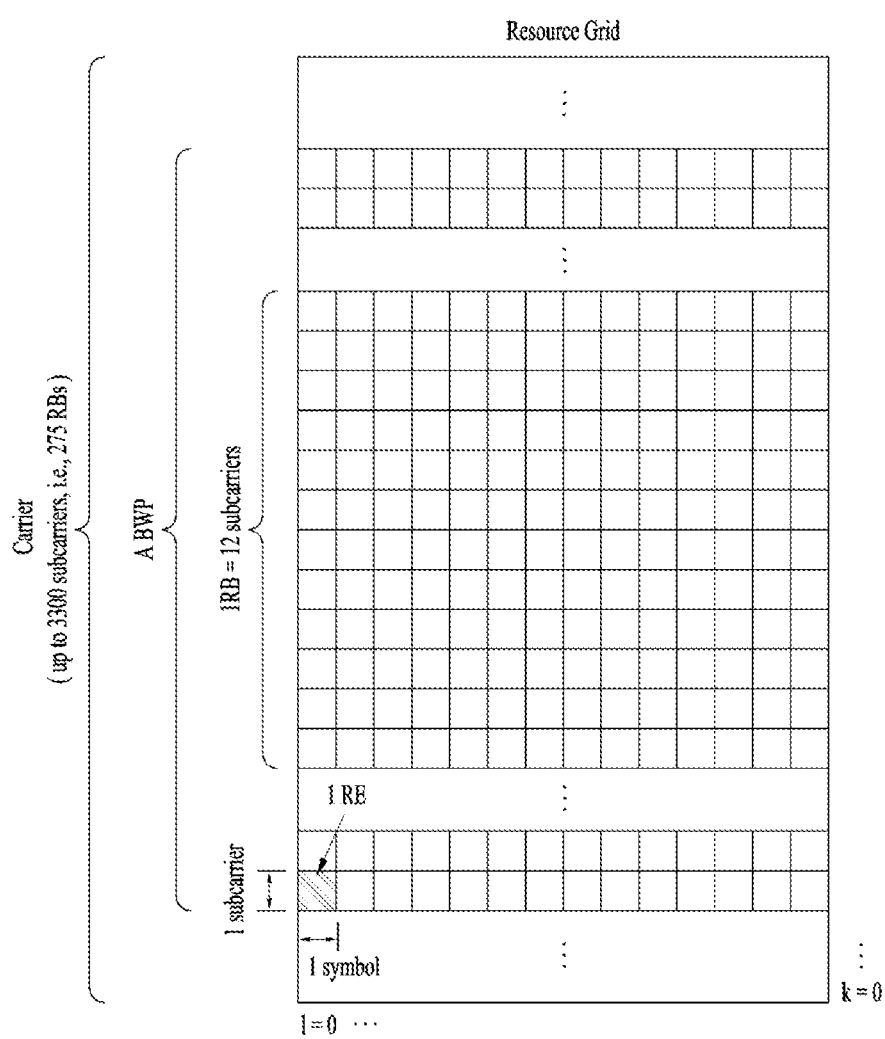
FIG. 7 is a diagram illustrating a slot structure in an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5)

BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
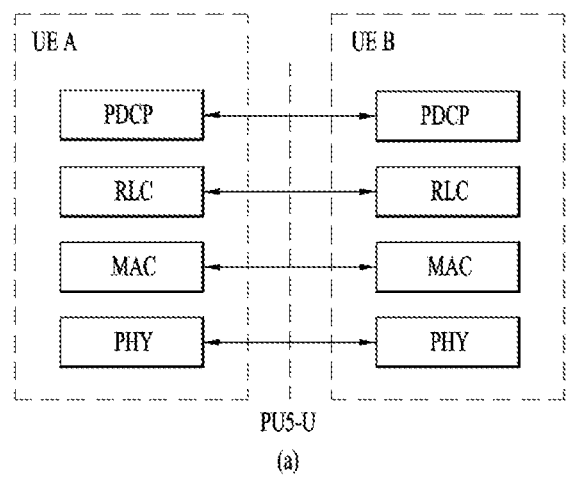
FIG. 8 is a diagram illustrating radio protocol architectures for sidelink (SL) communication according to an embodiment of the present disclosure.
Figure 8:
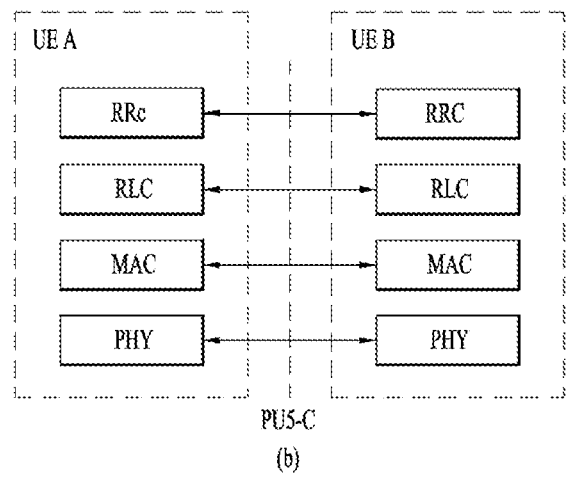

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
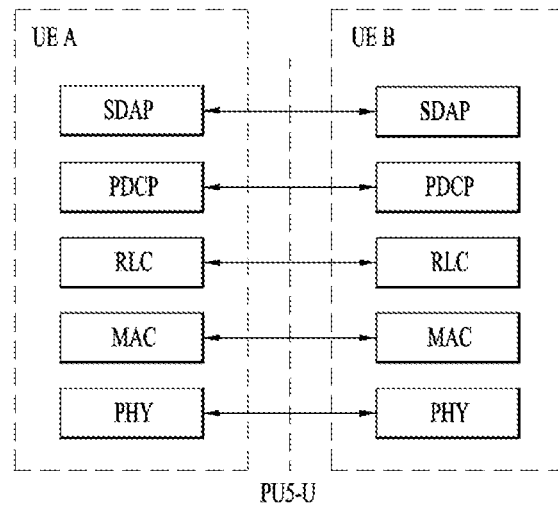
FIG. 9 is a diagram illustrating radio protocol architectures for SL communication according to an embodiment of the present disclosure.
Figure 9:
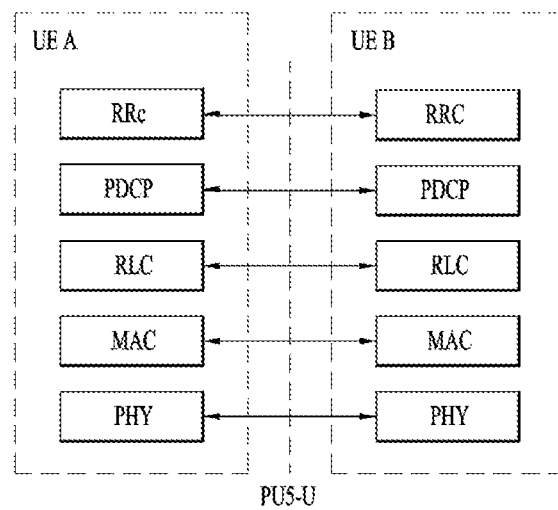

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Sidelink synchronization signals (SLSSs) and synchronization information will be described below.

The SLSSs, which are SL-specific sequences, may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold-sequences may be used for the S-SSS. For example, the UE may detect an initial signal and acquire synchronization by using the S-PSS. For example, the UE may acquire fine synchronization and detect a synchronization signal ID, by using the S-PSS and the S-SSS.

A physical sidelink broadcast channel (PSBCH) may be a (broadcast) channel carrying basic (system) information that the UE needs to first know before transmitting and receiving an SL signal. For example, the basic information may include information related to the SLSSs, duplex mode (DM) information, time division duplex (TDD) UL/DL (UL/DL) configuration information, resource pool-related information, information about the type of an application related to the SLSSs, subframe offset information, broadcast information, and so on. For example, the payload size of the PSBCH may be 56 bits, including a 24-bit cyclic redundancy check (CRC), for evaluation of PSBCH performance in NR V2X.

The S-PSS, S-SSS, and PSBCH may be included in a block format (e.g., SL synchronization signal (SL SS)/PSBCH block, hereinafter, referred to as sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in a carrier, and the transmission bandwidth of the S-SSB may be within a (pre)configured SL BWP. For example, the bandwidth of the S-SSB may be 11 RBs. For example, the PSBCH may span 11 RBs. The frequency position of the S-SSB may be (pre)set. Therefore, the UE does not need to perform hypothesis detection in a frequency to discover the S-SSB in the carrier.

In the NR SL system, a plurality of numerologies including different SCSs and/or CP lengths may be supported. As an SCS increases, the length of a time resource for S-SSB transmission of a UE may be shortened. Accordingly, in order to ensure coverage of the S-SSB, a transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be an NCP or an ECP. Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 10:
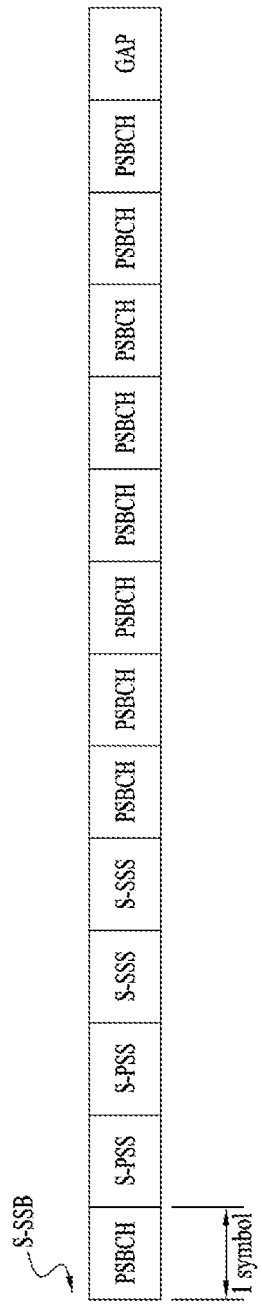
FIG. 10 is a diagram illustrating the structure of a secondary synchronization signal block (S-SSB) in a normal cyclic prefix (NCP) case according to an embodiment of the present disclosure.

FIG. 10 illustrates the structure of an S-SSB in an NCP case according to an embodiment of the present disclosure.

For example, when the CP type is NCP, FIG. 10 may be referred to for the structure of the S-SSB, that is, the order of symbols to which the S-PSS, S-SSS and PSBCH are mapped in the S-SSB transmitted by the transmitting UE.

Figure 11:
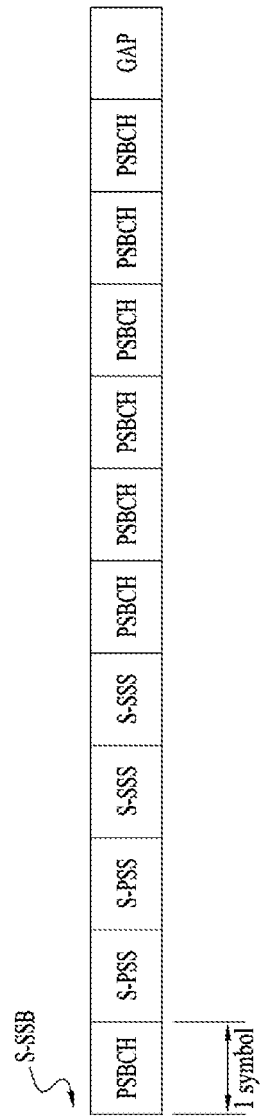
FIG. 11 is a diagram illustrating the structure of an S-SSB in an extended cyclic prefix (ECP) case according to an embodiment of the present disclosure.

FIG. 11 illustrates the structure of an S-SSB in an ECP case according to an embodiment of the present disclosure.

In the ECP case, for example, the number of symbols to which the PSBCH is mapped after the S-SSS in the S-SSB may be 6, unlike FIG. 10. Therefore, the coverage of the S-SSB may be different depending on whether the CP type is NCP or ECP.

Each SLSS may have a sidelink synchronization identifier (SLSS ID).

For example, in LTE SL or LTE V2X, the values of SLSS IDs may be defined based on combinations of two different S-PSS sequences and 168 different S-SSS sequences. For example, the number of SLSS IDs may be 336. For example, the value of an SLSS ID may be any one of 0 to 335.

For example, in NR SL or NR V2X, the values of SLSS IDs may be defined based on combinations of two different S-PSS sequences and 336 different S-SSS sequences. For example, the number of SLSS IDs may be 672. For example, the value of an SLSS ID may be any one of 0 to 671. For example, one of the two different S-PSSs may be associated with in-coverage and the other S-PSS may be associated with out-of-coverage. For example, the SLSS ID of 0 to 335 may be used for in-coverage, whereas the SLSS IDs of 336 to 671 may be used for out-coverage.

In order to improve the S-SSB reception performance of the receiving UE, the transmitting UE needs to optimize transmission power according to the characteristics of each signal included in the S-SSB. For example, the transmitting UE may determine a maximum power reduction (MPR) value for each signal included in the S-SSB according to the peak-to-average power ratio (PAPR) of the signal. For example, when the PAPR value is different between the S-PSS and the S-SSS in the S-SSB, the transmitting UE may apply an optimal MPR value to each of the S-PSS and the S-SSS to improve the S-SSB reception performance of the receiving UE. For example, a transition period may further be applied so that the transmitting UE performs an amplification operation for each signal. The transition period may preserve a time required for a transmission-end amplifier of the transmitting UE to perform a normal operation at the boundary at which the transmission power of the transmitting UE is changed. For example, the transition period may be 10 us in FR1, and 5 us in FR2. For example, a search window in which the receiving UE detects the S-PSS may be 80 ms and/or 160 ms.

Figure 12:
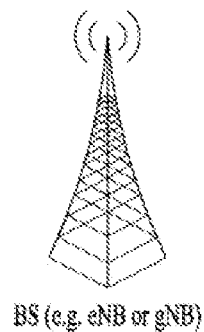
FIG. 12 is a diagram illustrating user equipments (UEs) which conduct V2X or SL communication between them according to an embodiment of the present disclosure.
Figure 12:
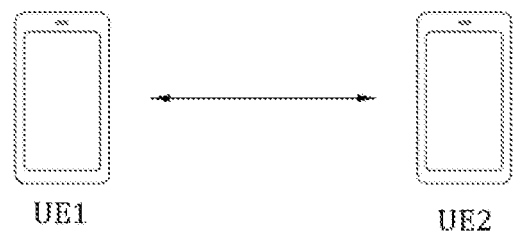

FIG. 12 illustrates UEs that conduct V2X or SL communication between them according to an embodiment of the present disclosure.

Referring to FIG. 12, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 13:
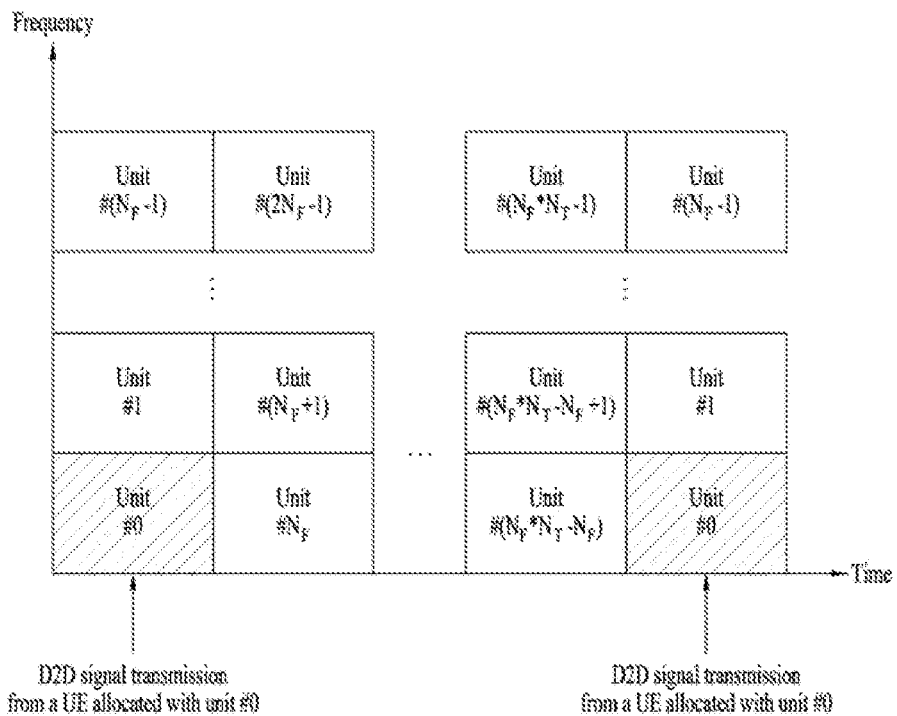
FIG. 13 is diagram illustrating resource units for V2X or SL communication according to an embodiment of the present disclosure.
Figure 14:
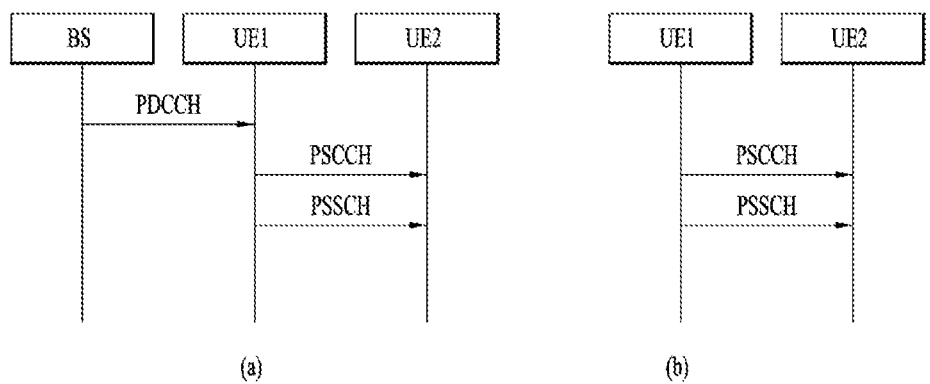
FIG. 14 is a diagram illustrating signal flows for V2X or SL communication procedures of a UE according to transmission modes according to an embodiment of the present disclosure.

FIG. 13 illustrates resource units for V2X or SL communication according to an embodiment of the present disclosure.

Referring to FIG. 13, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 13, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or An SL CSI-RS transmission indicator or information about the number of SL CSI-RS antenna ports (to be transmitted)

Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

A cooperative awareness message (CAM) and a decentralized environmental notification message (DENM) will be described below.

For V2V communication, a CAM which is a periodic message type and a DENM which is an event-triggered message type may be transmitted. The CAM may include basic vehicle information which includes dynamic state information about a vehicle such as a direction and a speed, static vehicle data such as dimensions, an external illumination state, and path details. The CAM may be 50 to 300 bytes long. The CAM is broadcast and should have a latency less than 100 ms. The DENM may be a message generated upon occurrence of a sudden incident such as vehicle breakdown and an accident. The DENM may be shorter than 3000 bytes, and all vehicles within a transmission range may receive the DENM. The DENM may have priority over the CAM.

Now, a description will be given of SL measurement and reporting.

For the purpose of QoS prediction, initial transmission parameter setting, link adaptation, link management, and admission control, SL measurement and reporting (e.g., reference signal received power (RSRP) or reference signal received quality (RSRQ) measurement and reporting) may be considered for an SL between UEs. For example, a receiving UE may receive an RS from a transmitting UE and measure a channel state for the transmitting UE based on the RS. The receiving UE may report CSI to the transmitting UE. The SL measurement and reporting may include channel busy ratio (CBR) measurement and reporting, and location information reporting. Examples of CSI for V2X may include a channel quality indicator (CQI), a precoding matrix index (PMI), a rank indicator (RI), an RSRP, an RSRQ, a pathgain/pathloss, a sounding reference signal (SRS) resource indicator (SRI), a CSI-RS resource indicator (CRI), an interference condition, and a vehicle motion. In the case of unicast communication, a CQI, an RI, and a PMI or some of the CQI, RI, and PMI may be supported in a non-subband-based aperiodic CSI report based on the assumption of four or fewer antenna ports. A CSI procedure may not depend on a standalone RS. CSI reporting may be enabled and disabled according to a configuration.

For example, the transmitting UE may transmit a CSI-RS to the receiving UE, and the receiving UE may measure a CQI or an RI using the CSI-RS. For example, the CSI-RS may be referred to as an SL CSI-RS. For example, the CSI-RS may be confined to within a PSSCH transmission. For example, the transmitting UE may transmit the CSI-RS in a PSSCH resource to the receiving UE.

A BWP and a resource pool will be described below.

When bandwidth adaptation (BA) is used, the reception bandwidth and transmission bandwidth of a UE do not need to be as large as the bandwidth of a cell, and may be adjusted. For example, a network/BS may indicate bandwidth adjustment to the UE. For example, the UE may receive information/a configuration for bandwidth adjustment from the network/BS. In this case, the UE may perform bandwidth adjustment based on the received information/configuration. For example, the bandwidth adjustment may include decrease/increase of a bandwidth, a change of the position of the bandwidth, or a change of the SCS of the bandwidth.

For example, the bandwidth may be reduced during a period of low activity to conserve power. For example, the position of the bandwidth may be shifted in the frequency domain. For example, the position of the bandwidth may be shifted in the frequency domain to increase scheduling flexibility. For example, the SCS of the bandwidth may be changed. For example, the SCS of the bandwidth may be changed to allow for different services. A subset of the total cell bandwidth of a cell may be referred to as a BWP. BA may be performed by configuring BWPs for a UE and notifying the UE of a current active BWP among the BWPs by the BS/network.

Figure 15:
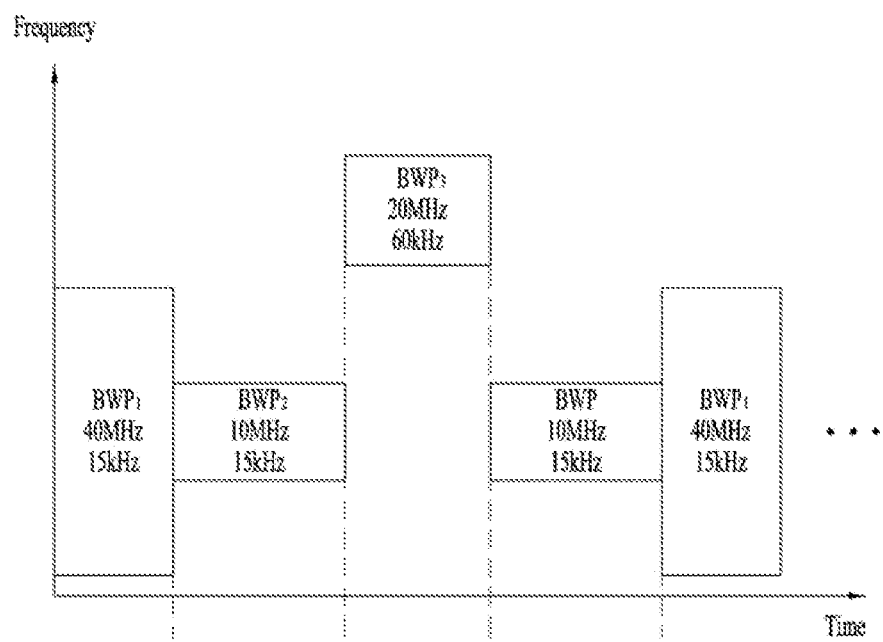
FIG. 15 is a diagram illustrating a plurality of bandwidth parts (BWPs) according to an embodiment of the present disclosure.

FIG. 15 illustrates a plurality of BWPs according to an embodiment of the present disclosure.

Referring to FIG. 15, BWP1 having a bandwidth of 40 MHz and an SCS of 15 kHz, BWP2 having a bandwidth of 10 MHz and an SCS of 15 kHz, and BWP3 having a bandwidth of 20 MHz and an SCS of 60 kHz may be configured.

Figure 16:
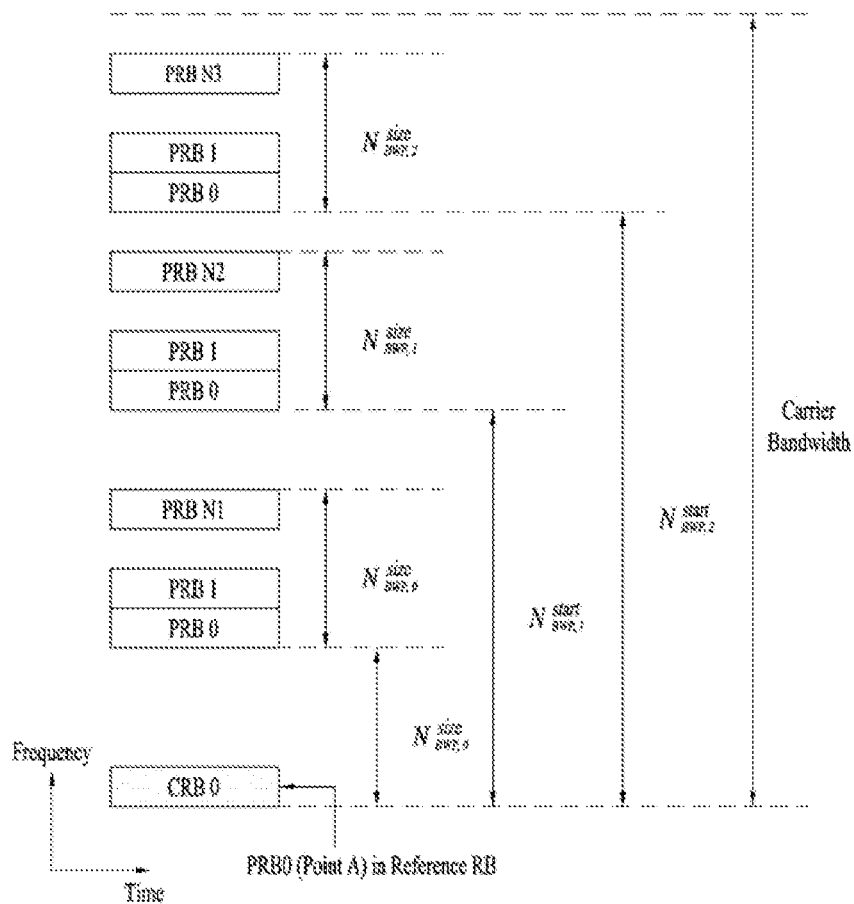
FIG. 16 is a diagram illustrating a BWP according to an embodiment of the present disclosure.
Figure 30:
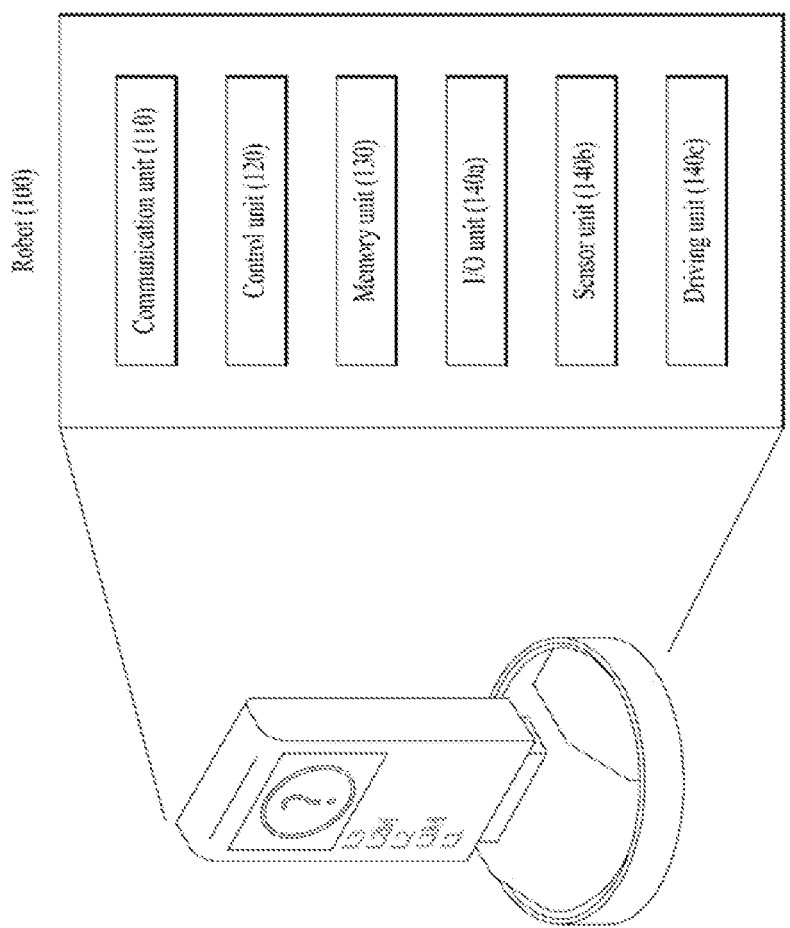

FIG. 16 illustrates BWPs according to an embodiment of the present disclosure. In the embodiment of FIG. 30, it is assumed that there are three BWPs.

Referring to FIG. 16, common resource blocks (CRBs) may be carrier RBs numbered from one end of a carrier band to the other end of the carrier band. PRBs may be RBs numbered within each BWP. A point A may indicate a common reference point for a resource block grid.

A BWP may be configured by the point A, an offset NstartBWP from the point A, and a bandwidth NsizeBWP. For example, the point A may be an external reference point for a PRB of a carrier, in which subcarrier 0 is aligned for all numerologies (e.g., all numerologies supported in the carrier by the network). For example, the offset may be a PRB interval between the lowest subcarrier for a given numerology and the point A. For example, the bandwidth may be the number of PRBs for the given technology.

A BWP may be defined for SL. The same SL BWP may be used for transmission and reception. For example, a transmitting UE may transmit an SL channel or an SL signal in a specific BWP, and a receiving UE may receive the SL channel or the SL signal in the specific BWP. In a licensed carrier, an SL BWP may be defined separately from a Uu BWP, and have separate configuration signaling from the Uu BWP. For example, a UE may receive a configuration for the SL BWP from the BS/network. The SL BWP may be (pre)configured for an out-of-coverage NR V2X UE and an RRC_IDLE UE in the carrier. For a UE in RRC_CONNECTED mode, at least one SL BWP may be activated in the carrier.

A resource pool may be a set of time-frequency resources available for SL transmission and/or SL reception. From the viewpoint of a UE, time-domain resources of a resource pool may not be contiguous. A plurality of resource pools may be (pre)configured for the UE in one carrier. From the viewpoint of the PHY layer, the UE may perform unicast, groupcast, and broadcast communication using a configured or preconfigured resource pool.

In the NR system, up to four BWPs each representing a continuous set of RBs may be allocated to a UE, and one of the four BWPs may be activated and used. Each BWP may be configured with a different numerology (e.g., SCS, TTI, and so on). When a high frequency band (e.g., mmWave) is used in V2X communication, the following problems may occur.

As a used frequency band increases, phase noise generally increases. The increment of phase noise is proportional to the square of the frequency.

As the phase noise increases, inter-carrier interference (ICI) also increases, and the increased ICI may cause fatal performance degradation in an OFDM system. In order to reduce the ICI-caused performance degradation, an SCS should be increased in an mmWave band.

Since the length of an OFDM symbol to be transmitted is inversely proportional to the SCS, the OFDM symbol used for transmission is shorter for a larger SCS. The decreased OFDM symbol length leads to a decrease in the size of an added CP, resulting in vulnerability to ISI or propagation delay.

Figure 17:
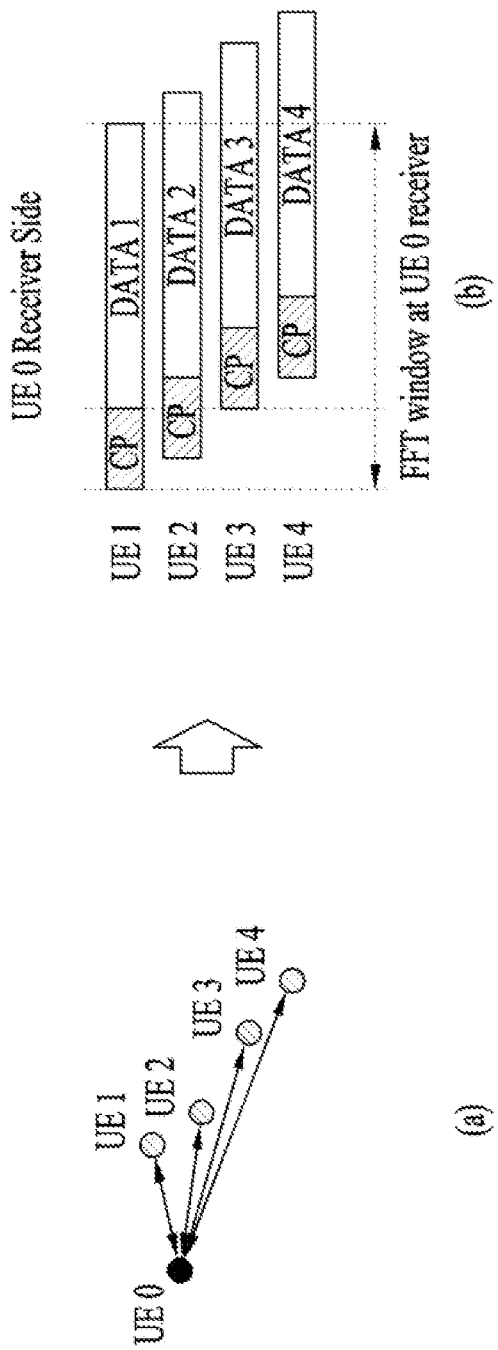
FIG. 17 is a diagram referred to for describing a propagation delay in a millimeter wave (mmWave) band.

FIG. 17 is a diagram referred to for describing a propagation delay in an mmWave band.

Referring to FIG. 17, UE 0 communicates with a plurality of different UEs, UE 1, UE 2, UE 3, and UE 4 in a unicast manner It is assumed that the power of symbols included in signals received from UE 1 to UE 4 by UE 0 is almost similar through power control. Each unicast link may have a different propagation delay, and thus the signals received from the plurality of UEs by UE 0 may have different times of arrival.

That is, OFDM symbols having similar power values may have different propagation delays according to their unicast links, and thus arrive after a given CP length. When a larger SCS is used for a frequency in the mmWave band and thus a total transmission symbol length is shortened, this phenomenon may be more serious. When UE 0 performs fast Fourier transform (FFT) for decoding an OFDM symbol received on each unicast link, UE 0 may decode symbols received from UE 1 and UE 2 on the assumption that FFT is performed based on a symbol that arrives first (that is, the symbol received from UE 1). However, symbols received from UE 3 and UE 4 beyond the CP length may cause ICI/ISI, thereby degrading the decoding performance of the symbols received from UE 1 and UE 2. In this case, UE 0 may fail in decoding the symbols received from UE 3 and UE 4.

To solve problems caused by a propagation delay in mmWave, an extended CP may be used. Specifically, when an extended CP longer than a normal CP is used, the propagation delay-caused problems may be solved by receiving signals from UE 1 to UE 4 within the length of the extended CP. However, as many time resources as a CP length increment may further be used.

In the present disclosure, a plurality of BWPs may be activated or used to alleviate ICI/ISI that may occur to a link due to a shortened CP length in mmWave V2X communication as described above or to efficiently use resources. The plurality of BWPs may be simultaneously active in the time domain.

Figure 18:
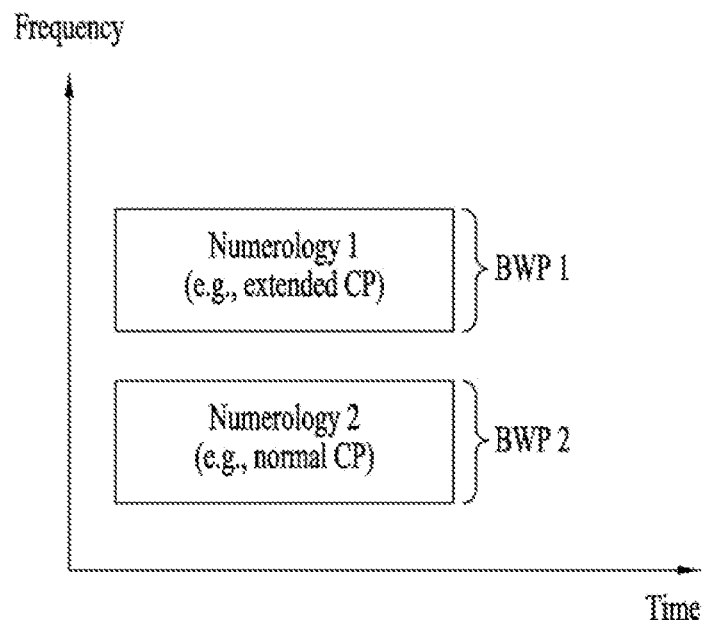
FIG. 18 is a diagram illustrating exemplary BWPs according to numerologies.

FIG. 18 is a diagram illustrating exemplary BWPs according to numerologies.

Referring to FIG. 18, BWPs available to a UE may be pre-classified according to numerologies. For example, BWP 1 in which the extended CP may be used and BWP 2 in which the normal CP may be used may be predetermined. The BWPs may be multiplexed in frequency division multiplexing (FDM).

Because a UE has no prior knowledge of a numerology with which communication is effective, the UE may transmit the same discovery message in a plurality of BWPs with different numerologies in a discovery process of transmitting a discovery message on a discovery channel In this case, the UE may transmit the discovery message in each BWP based on the numerology of the BWP. For example, when there are BWP 1 using the extended CP and BWP 2 using the normal CP, each of UE 1 to UE 4 may transmit discovery messages including the same content in BWP 1 and BWP 2 according to the numerologies of the BWPs.

Figure 19:
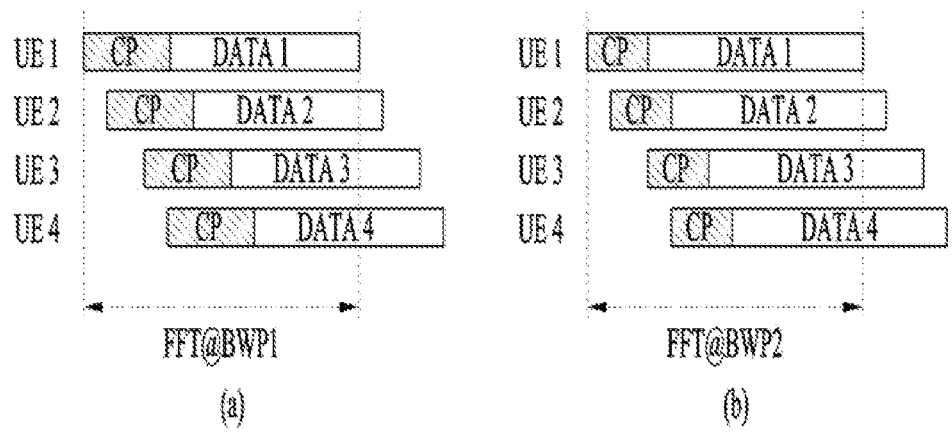
FIG. 19 is a diagram illustrating orthogonal frequency division multiplexing (OFDM) symbols in a discovery message transmitted in each BWP.

FIG. 19 is a diagram illustrating OFDM symbols in a discovery message transmitted in each BWP.

Referring to FIG. 19, each of UE 1 to UE 4 transmits a discovery message in BWPs allocated to the UE. Herein, the discovery message is transmitted using the extended CP in BWP 1 allocated for use of the extended CP, and the discovery message is transmitted using the normal CP in BWP 2 allocated for use of the normal CP. The discovery message may be transmitted simultaneously in the BWPs.

Hereinafter, a UE that receives a discovery message from at least one UE, such as UE 0, may be referred to as a receiving UE, and a UE that transmits a discovery message to at least one UE, such as UE 1 to UE 4, may be referred to as a transmitting UE.

1. BWP Selection Method of Transmitting UE

According to an embodiment of the present disclosure, when the receiving UE is in an active state for at least one (e.g., BWP 1 and BWP 2) of a plurality of BWPs configured for/allocated to the receiving UE, the receiving UE may receive and decode a discovery message of at least one transmitting UE (e.g., UE 1 to UE 4) transmitted in the at least one active BWP. The receiving UE may indicate a decoding result of the discovery message to the transmitting UE according to the following Option A1 to Option A5.

Option A1

The receiving UE may feed back decoding results in all active BWPs to each transmitting UE. For example, the receiving UE may transmit a decoding result in each of BWP 1 and 2 to each of the transmitting UEs.

Option A2

The receiving UE may feed back the decoding results in any one of the active BWPs to each transmitting UE. For example, the receiving UE may feed back the decoding results to each transmitting UE in one more reliable BWP (e.g., a BWP using the extended CP).

Option A3

The receiving UE may feed back the decoding results to each transmitting UE in any one of the active BWPs. For example, the receiving UE may measure signal values such as RSSIs/RSRPs/RSRQs in the discovery messages received in the active BWPs from the transmitting UEs, select any one BWP based on the measurements, and feed back the decoding results in the selected BWP to each transmitting UE. In this case, the receiving UE may measure the RSSIs, RSRPs, or RSRQs of discovery messages transmitted in the active BWPs by any one transmitting UE, and select a BWP in which a discovery message having a highest measurement has been transmitted.

Option A4

The receiving UE may feed back the decoding results only to one transmitting UE on an active BWP basis. In this case, the receiving UE may feed back not only the decoding results for the one transmitting UE but also the decoding results for the remaining transmitting UEs that have transmitted discovery messages in the active BWPs. The receiving UE may allow the remaining transmitting UEs to overhear the feedback message including the decoding results.

In Option A4, the one transmitting UE to which the receiving UE transmits the decoding results on an active BWP basis may be, but not limited to, a UE selected based on RSSIs/RSRPs/RSRQs measured in the discovery messages as in Option A3.

Option A5

The receiving UE may feed back the decoding results to any one of the transmitting UEs in any one of the active BWPs. In this case, the receiving UE may feed back not only the decoding results for the one transmitting UE but also the decoding results for the remaining transmitting UEs that have transmitted the discovery messages in the active BWPs. The receiving UE may allow the remaining transmitting UEs to overhear the feedback message including the decoding results.

In Option A5, the one BWP or the one transmitting UE in or to which the receiving UE transmits the decoding results may be, but not limited to, a BWP or a UE selected based on RSSIs/RSRPs/RSRQs measured in the discovery messages as in Option A3.

Based on the above-described various implementations of the present disclosure, a transmitting UE which has received the decoding results of discovery messages from the receiving UE may select any one BWP available for communication and use the selected BWP for data communication. The BWP available for communication may be a BWP in which a discovery message successfully decoded by the receiving UE has been transmitted among the plurality of active BWPs. For example, a transmitting UE (e.g., UE 1) that has received a feedback indicating that communication is possible in BWP 1 and BWP 2 from the receiving UE may select BWP 2 using the normal CP with a relatively small CP overhead and transmit data in BWP 2. Alternatively, the transmitting UE may select BWP 1 using the extended CP for some other reason despite the burden of CP overhead and transmit data in BWP 1.

Each transmitting UE (e.g., UE 1 to UE 4) may transmit information about any one of the BWPs fed back from the receiving UE, that is, information about a BWP to be used for data communication, to the receiving UE (e.g., UE 0). In this case, the transmitting UE may transmit, to the receiving UE, information about the BWP to be used for data communication based on the following Option B1 to Option B4.

Option B1

A transmitting UE may indicate its selected BWP to the receiving UE in the same available BWPs as those in which the discovery messages have been transmitted, that is, in the active BWPs.

Option 2

A transmitting UE may indicate its selected BWP to the receiving UE in a BWP using a more robust CP in terms of delay spread.

Option B3

A transmitting UE may indicate its selected BWP to the receiving UE in a BWP with a better communication performance based on signal measurement results such as the RSSIs/RSRPs/RSRQs of a feedback signal from the receiving UE. For example, the transmitting UE may measure RSSIs, RSRPs, or RSRQs in a feedback signal indicating decoding results received from the receiving UE and indicate its selected BWP to the receiving UE in a BWP in which a feedback signal with a better measurement result has been transmitted.

Option B4

A transmitting UE may indicate its selected BWP to the receiving UE in a BWP to be used for data communication (i.e., a BWP selected by the transmitting UE).

Figure 20:
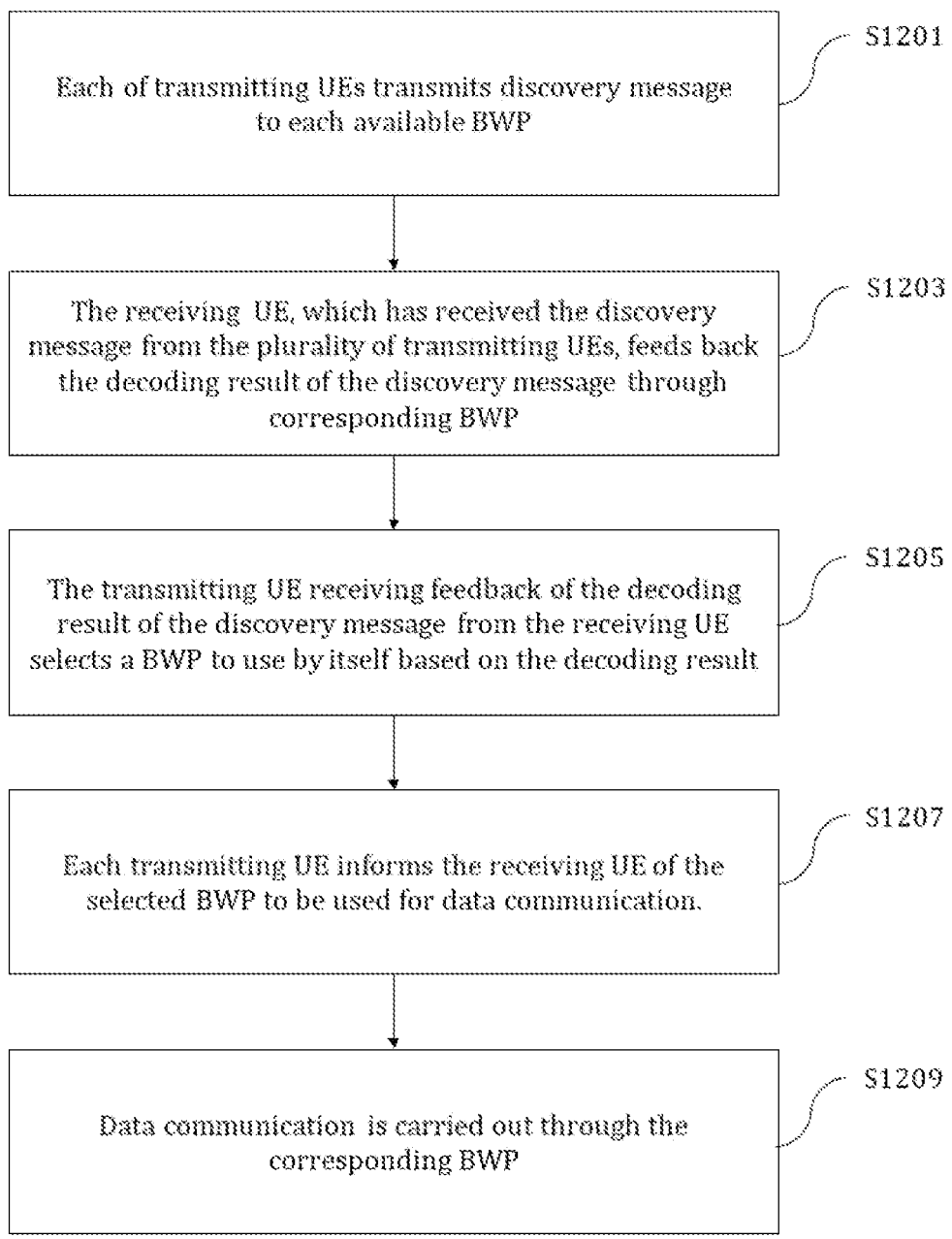
FIG. 20 is a flowchart illustrating a BWP selection method according to an embodiment of the present disclosure.

FIG. 20 is a flowchart illustrating a BWP selection method according to an embodiment of the present disclosure.

Referring to FIG. 20, a transmitting UE may transmit a discovery message in available BWPs, that is, active BWPs to a receiving UE in operation S1201.

In operation S1203, the receiving UE may receive and decode a discovery message from at least one transmitting UE. Further, the receiving UE may feed back decoding results to the transmitting UE. A BWP in which the decoding results are fed back may be selected, for example, based on Option A1 to Option A5 of the present disclosure.

In operation S1205, the transmitting UE may receive the decoding results of the transmitted discovery message from the receiving UE and select a BWP to be used based on the decoding results. The transmitting UE may select the BWP to be used based on Option B1 to Option B4 of the present disclosure.

In operation S1207, the transmitting UE may indicate the BWP selected in operation S1205 to the receiving UE.

In operation S1209, the transmitting UE and the receiving UE may perform SL communication based on the selected BWP.

2. BWP Selection Method of Receiving UE

According to an embodiment of the present disclosure, when a receiving UE (e.g., UE 0) is in the active state for BWP 1 and BWP 2, the receiving UE may receive and decode discovery messages transmitted in the BWPs by transmitting UEs (e.g., UE 1 to UE 4). The receiving UE may recommend a suitable BWP for each transmitting UE based on decoding results.

Specifically, the receiving UE may select one of a plurality of active BWPs for a transmitting UE among a plurality of BWPs configured for the receiving UE based on reception times of discovery signals from the transmitting UE and the length of the CPs of the received discovery signals. In the case where the active BWPs include a BWP configured to be used with the normal CP and a BWP configured to be used with the extended CP as described before, when the reception time of a discovery signal received in each of the active BWPs does not fall within the length of the normal CP, the receiving UE may select and recommend the BWP configured to be used with the extended CP.

Alternatively, when the reception time of the discovery signal received in each active BWP falls within the lengths of both of the normal CP and the extended CP, the receiving UE may select and recommend the BWP configured to be used with the normal CP. The receiving UE may select an active BWP for each transmitting UE, that is, UE-specifically.

For example, UE 0 may recommend BWP 1 and BWP 2 to UE 1 and UE 2 capable of decoding using the normal CP, and BWP 1 to UE 3 and UE 4 which transmit signals beyond the length of the normal CP, as follows.

UE1→{BWP1, BWP2}
UE2→{BWP1, BWP2}
UE3→{BWP1}
UE4→{BWP1}

The receiving UE may transmit information about a BWP to be used, that is, a selected active BWP to a transmitting UE based on the following Option C1 to Option C6.

Option C1
The receiving UE may indicate a recommended BWP to each transmitting UE in every active BWP. Despite high reliability, Option C1 may cause unnecessary redundancy.

Option C2
The receiving UE may indicate a recommended BWP to a transmitting UE only in the recommended BWP.

Option C3
The receiving UE may indicate a recommended BWP to a transmitting UE in one BWP with higher reliability (e.g., BWP 1 using the extended CP) among the active BWPs.

Option C4
The receiving UE may select a BWP in which a discovery message with best performance has been transmitted based on the performance of discovery messages received from a transmitting UE, and indicate a recommended BWP to the transmitting UE in the selected BWP. For example, the receiving UE may measure the RSSIs, RSRPs, or RSRQs of the received discovery messages and select a BWP in which a discovery message with the best measurement result has been transmitted.

Option C5
The receiving UE may feed back a recommended BWP only to one UE in each active BWP, including information about recommended BWPs for the other UEs in the feedback. The receiving UE may allow the other transmitting UEs to overhear a feedback message including the information about the recommended BWPs.

Option C6
The receiving UE may feed back a recommended BWP to one UE only in one of all active BWPs, including information about recommended BWPs for the other UEs in the feedback. The receiving UE may allow the other transmitting UEs to overhear a feedback message including the information about the recommended BWPs.

When the receiving UE autonomously determines some or all BWPs for use in communication according to the present disclosure, all available communication links may be established in an optimized state in one BWP, thereby reducing the power consumption of the receiving UE.

When the receiving UE recommends a BWP to a transmitting UE, the receiving UE may recommend a plurality of BWPs or a BWP preferred by the transmitting UE. In this case, the receiving UE may indicate the index of the preferred BWP among the plurality of BWPs to the transmitting UE. Alternatively, the receiving UE may prioritize the plurality of BWPs and indicate the plurality of BWPs and information about the priorities of the plurality of BWPs together.

Each transmitting UE may select its preferred BWP from among allocated BWPs (i.e., active BWPs). For example, each transmitting UE may select a BWP recommended by the receiving UE as its preferred BWP. Alternatively, the transmitting UE may select a BWP based on the priorities of the BWPs. Alternatively, the transmitting UE may select a BWP in a different manner depending on whether resources are available in each BWP or whether a numerology corresponding to each BWP is effective for communication. The transmitting UE may transmit a desired data service in the selected BWP.

Figure 21:
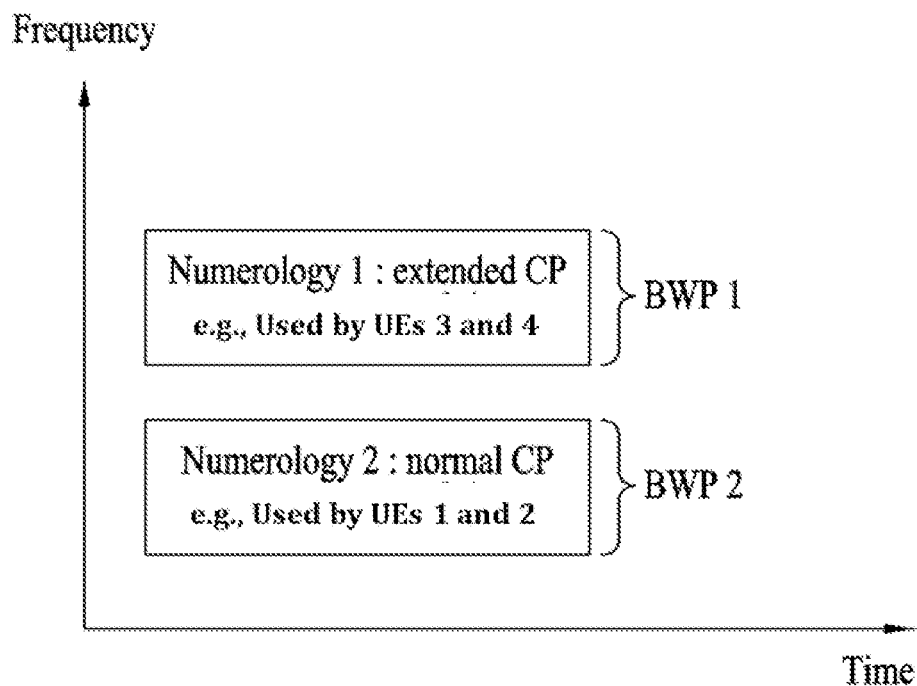
FIG. 21 is a diagram illustrating a BWP selection method of a UE according to an embodiment of the present disclosure.

FIG. 21 is a diagram referred to for describing a BWP selection method of a UE according to an embodiment of the present disclosure.

Referring to FIG. 21, although both of BWP 1 and BWP 2 are available to UE 1 and UE 2, each of UE 1 and UE 2 may select and use only one of BWP 1 and BWP 2 in actual data communication according to the situation of the UE and should perform communication according to the numerology of the selected BWP. UE 1 and UE 2 may select BWPs for data transmission based on BWPs recommended to them by the receiving UE (e.g., UE 0). For example, when BWP 2 is recommended to UE 1 and UE 2, UE 1 and UE 2 may select BWP 2 from between BWP 1 and BWP 2 and perform data communication in the selected BWP, BWP 2. For UE 3 and UE 4, only BWP 1 is selectable, and thus data transmission may be performed in BWP 1.

Figure 22:
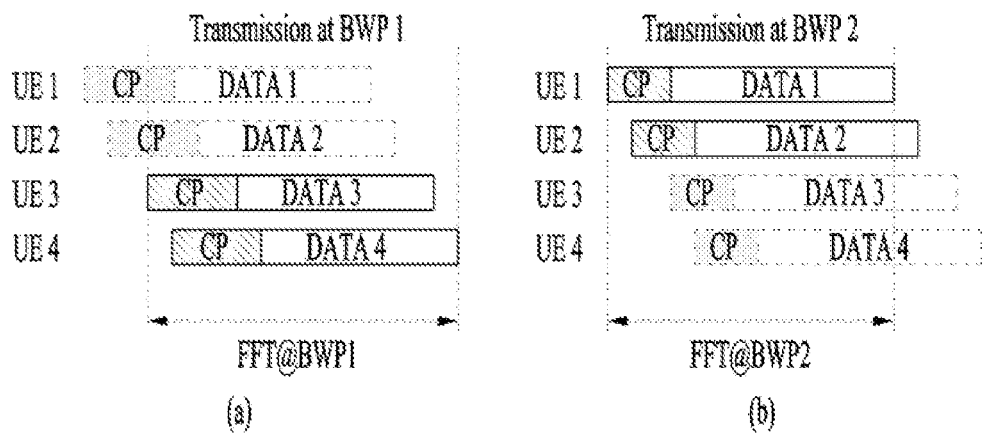
FIG. 22 is a diagram illustrating signals transmitted in a selected BWP according to an embodiment of the present disclosure.

FIG. 22 is a diagram illustrating signals in selected BWPs according to an embodiment of the present disclosure.

Referring to FIG. 22, it is assumed that when each transmitting UE selects a BWP for use in data transmission, an actual transmission signal, that, symbols are synchronized on a BWP basis. UE 3 and UE 4 perform data transmission in BWP 1 using the extended CP, and UE 1 and UE 2 perform data transmission in BWP 2 using the normal CP.

When a suitable BWP is selected for each UE and communication is performed in the selected BWP, ICI/ISI may be reduced, compared to communication using the normal CP only in one BWP. For example, when the receiving UE decodes signals received from UE 1 and UE 2, ICI/ISI that may occur due to symbols transmitted from other UE 3 and UE 4 outside of a given CP length may be reduced. That is, the performance degradation of communication links between the receiving UE and UE 1 and UE 2 may be mitigated.

Further, because the extended CP is used only for some of a plurality of UEs, a latency or time resource loss caused by the use of the extended CP for all communication may be minimized.

Figure 23:
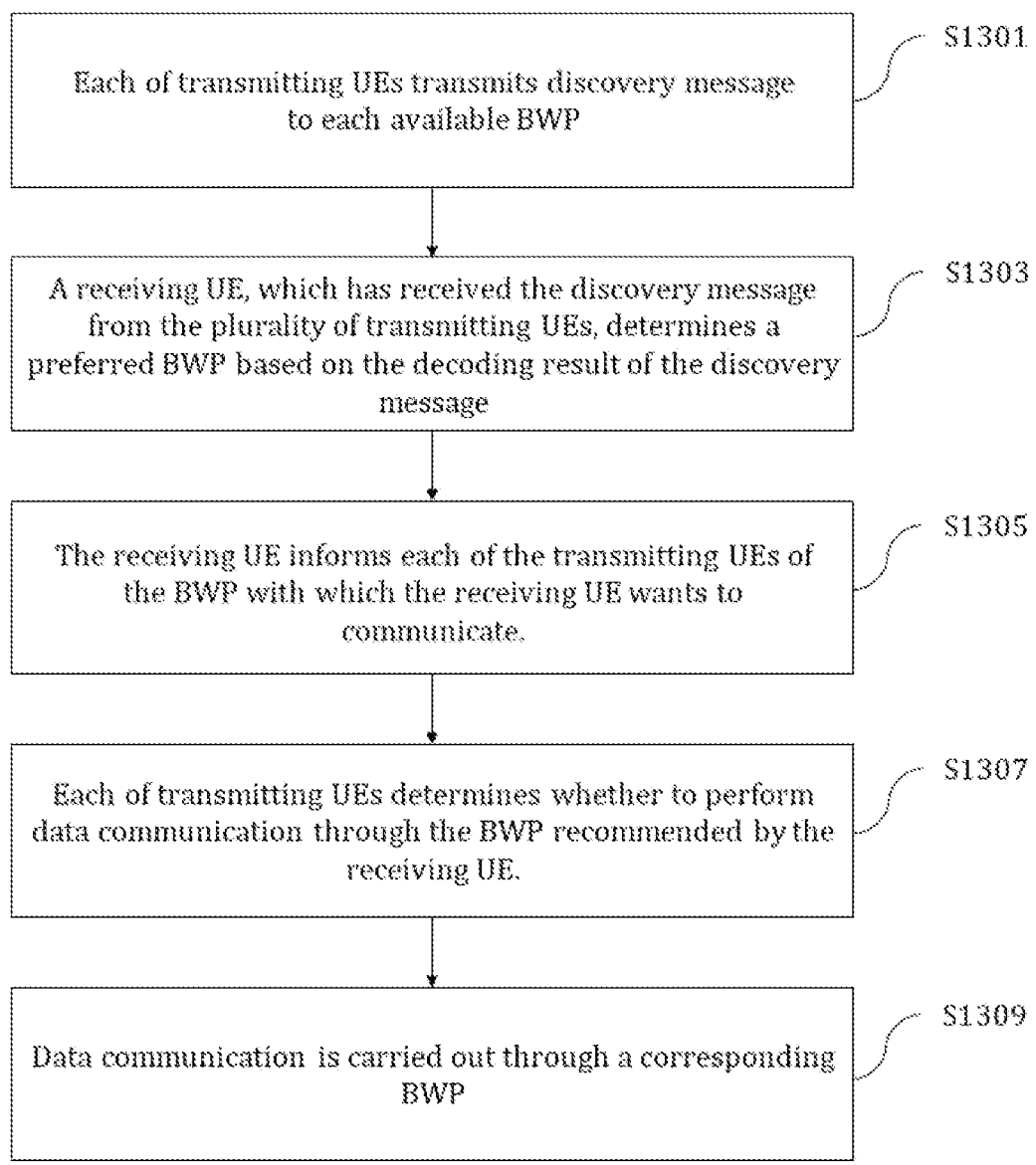
FIG. 23 is a flowchart illustrating a BWP selection method of a UE according to another embodiment of the present disclosure.

FIG. 23 is a flowchart illustrating a BWP selection method of a UE according to another embodiment of the present disclosure.

Referring to FIG. 23, a transmitting UE may transmit discovery messages in available BWPs, that is, active BWPs to a receiving UE in operation S1301.

In operation S1303, the receiving UE may receive and decode discovery messages from at least one transmitting UE. Further, the receiving UE may determine its preferred BWP based on the decoding results of the discovery messages. For example, the receiving UE may determine the preferred BWP depending on whether decoding is possible using the normal CP.

In operation S1305, the receiving UE may transmit information about its recommended BWP to each transmitting UE. The receiving UE may transmit the information about the recommended BWP to the transmitting UE based on the afore-described Option C1 to Option C6.

In operation S1307, each transmitting UE may determine whether to perform data communication in the BWP recommended by the receiving UE. For example, the transmitting UE may determine whether to perform data communication in the recommended BWP based on whether there are resources available in each BWP or whether a numerology corresponding to each BWP is more effective for communication.

In operation S1309, the transmitting UE and the receiving UE may perform SL communication based on a selected BWP.

Figure 24:
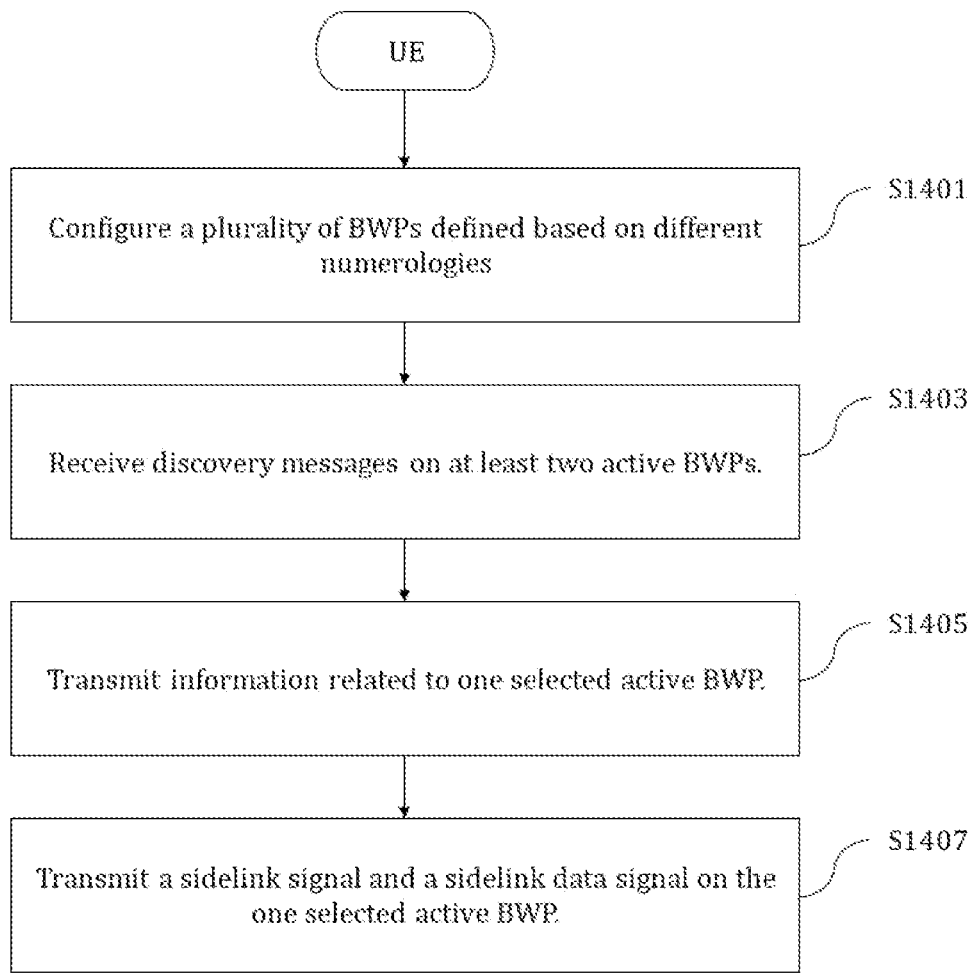
FIG. 24 is a flowchart illustrating an SL signal transmission method according to an embodiment of the present disclosure.

FIG. 24 is a flowchart illustrating an SL signal transmission method according to an embodiment of the present disclosure.

Referring to FIG. 24, a UE may be preconfigured with a plurality of BWPs defined based on different numerologies by a BS in operation S1401.

In operation S1403, the UE may receive discovery signals in at least two of the plurality of BWPs from at least one other UE. The at least two active BWPs may be activated simultaneously in the time domain. That is, the UE may transmit and receive data in a plurality of BWPs which have been activated simultaneously.

In operation S1405, the UE may transmit information about one active BWP selected from among the at least two active BWPs to the at least one other UE. The selected one active BWP may be selected based on the reception times of the discovery signals and the lengths of CPs in the discovery signals. The selected one active BWP may be selected UE-specifically.

In operation S1407, the UE may transmit an SL control signal and an SL data signal in the selected one active BWP to the at least one other UE.

The at least two active BWPs may include a first BWP configured to be used only with the normal CP and a second BWP configured to be used only with the extended CP. Based on the reception times of the discovery signals not being included in the length of the normal CP, the selected one active BWP may be the second BWP.

Alternatively, based on the reception times of the discovery signals being included in the length of the normal CP, the selected one active BWP may be the first BWP.

As described above, when the at least two active BWPs include the first BWP and the second BWP, information about the selected one active BWP may be transmitted in the second BWP.

Alternatively, the information about the selected one active BWP may be transmitted in a BWP having one of a highest RSSI, a highest RSRP, and a highest RSRQ among the at least two active BWPs.

It is obvious that each of the examples of the proposed methods may also be included as one of various embodiments of the present disclosure, and thus each example may be regarded as a kind of proposed method. Although the proposed methods may be implemented independently, some of the proposed methods may be combined (or merged) and implemented. The methods proposed in the present disclosure have been described in the context of the 3GPP NR system for convenience of description, the scope of systems to which the proposed methods are applied may be extended to other systems in addition to the 3GPP NR system. For example, the proposed methods of the present disclosure may be extended and applied to D2D communication. Here, D2D communication refers to direct communication between UEs over a radio channel. Although the UE means a user terminal, a network equipment such as a BS may also be regarded as a kind of UE if the network equipment transmits and receives a signal according to UE-to-UE communication schemes. In addition, the proposed methods of the present disclosure may be limitedly applied to MODE 3 V2X operations (and/or MODE 4 V2X operations). For example, the proposed methods of the present disclosure may be limitedly applied to transmission of a preconfigured (and/or signaled) (specific) V2X channel (and/or signal) (e.g., PSSCH (and/or related) PSCCH and/or PSBCH)). For example, the proposed methods of the present disclosure may be limitedly applied when a PSSCH and a PSCCH (related thereto) are transmitted such that they are located to be adjacent (and/or non-adjacent) (in the frequency domain) (and/or when transmission is performed based on the value (and/or range) of a preconfigured (and/or signaled) MCS (coding rate and/or RB). For example, the proposed methods of the present disclosure may be limitedly applied to MODE 3 (and/or MODE 4) V2X carriers (MODE 4 (and/or 3) SL (and/or UL) SPS carriers and/or MODE 4 (and/or 3) dynamic scheduling carriers). Moreover, the proposed methods of the present disclosure may be (limitedly) applied when the positions and/or number of synchronization signal (transmission (and/or reception)) resources (and/or the positions and/or number of subframes in a V2X resource pool (and/or the size and number of subchannels)) are the same (and/or (partially) different) between carriers. For example, the proposed methods of the present disclosure may be extended and applied to (V2X) communication between a BS and a UE. For example, the proposed methods of the present disclosure may be limitedly applied to unicast (SL) communication (and/or multicast (or groupcast) (SL) communication and/or broadcast (SL) communication).

Example of Communication System to Which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 25:
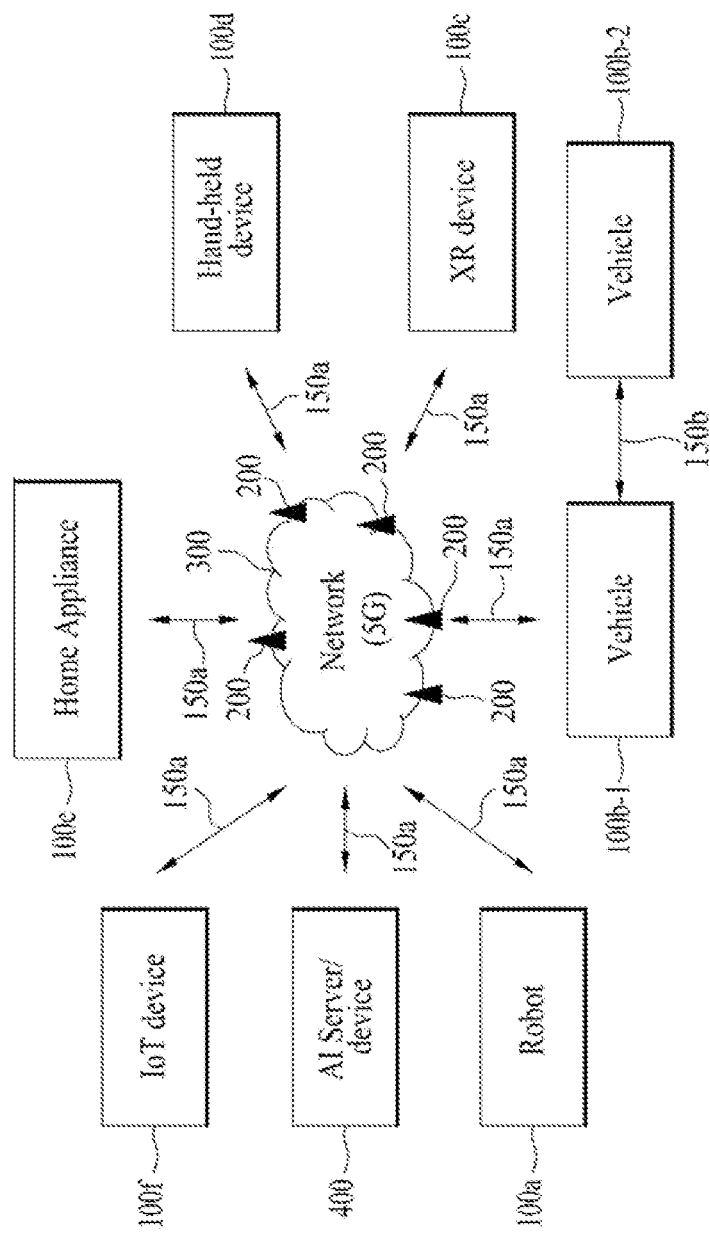
FIGS. 25 to 31 are block diagrams illustrating various devices applicable to embodiment(s) of the present disclosure.

FIG. 25 illustrates a communication system 1 applied to the present disclosure.

Referring to FIG. 25, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to Which the Present Disclosure is Applied

Figure 26:
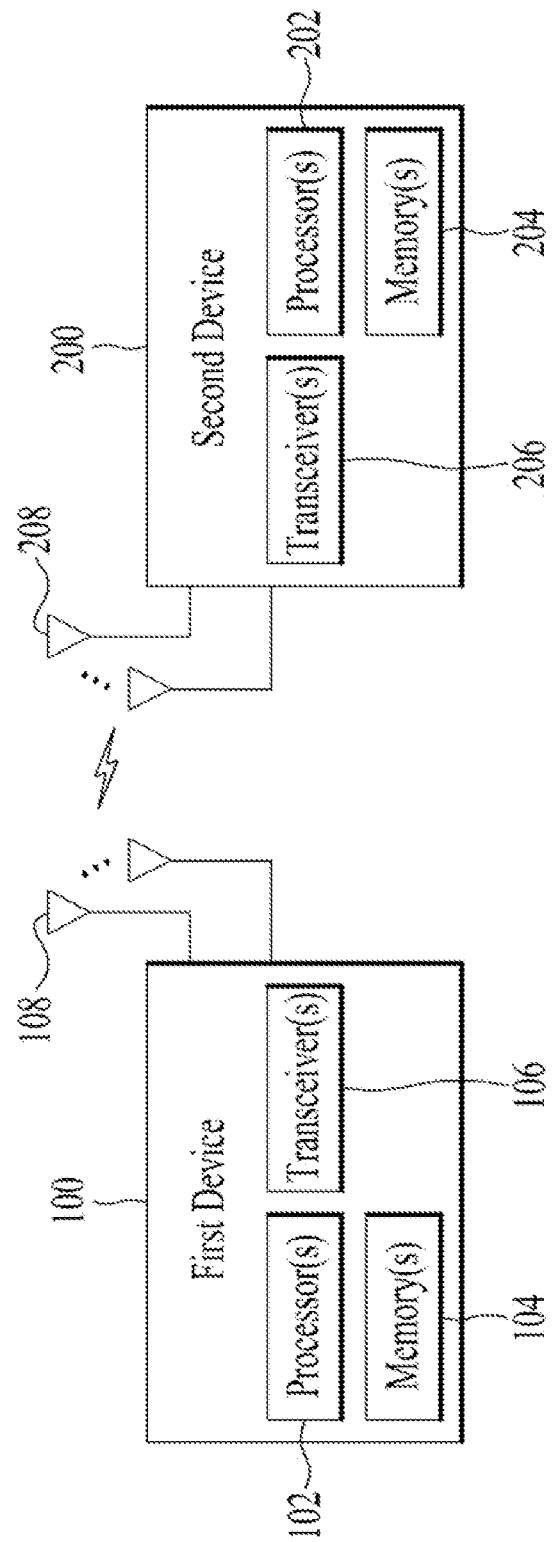

FIG. 26 illustrates wireless devices applicable to the present disclosure.

Referring to FIG. 26, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 27:
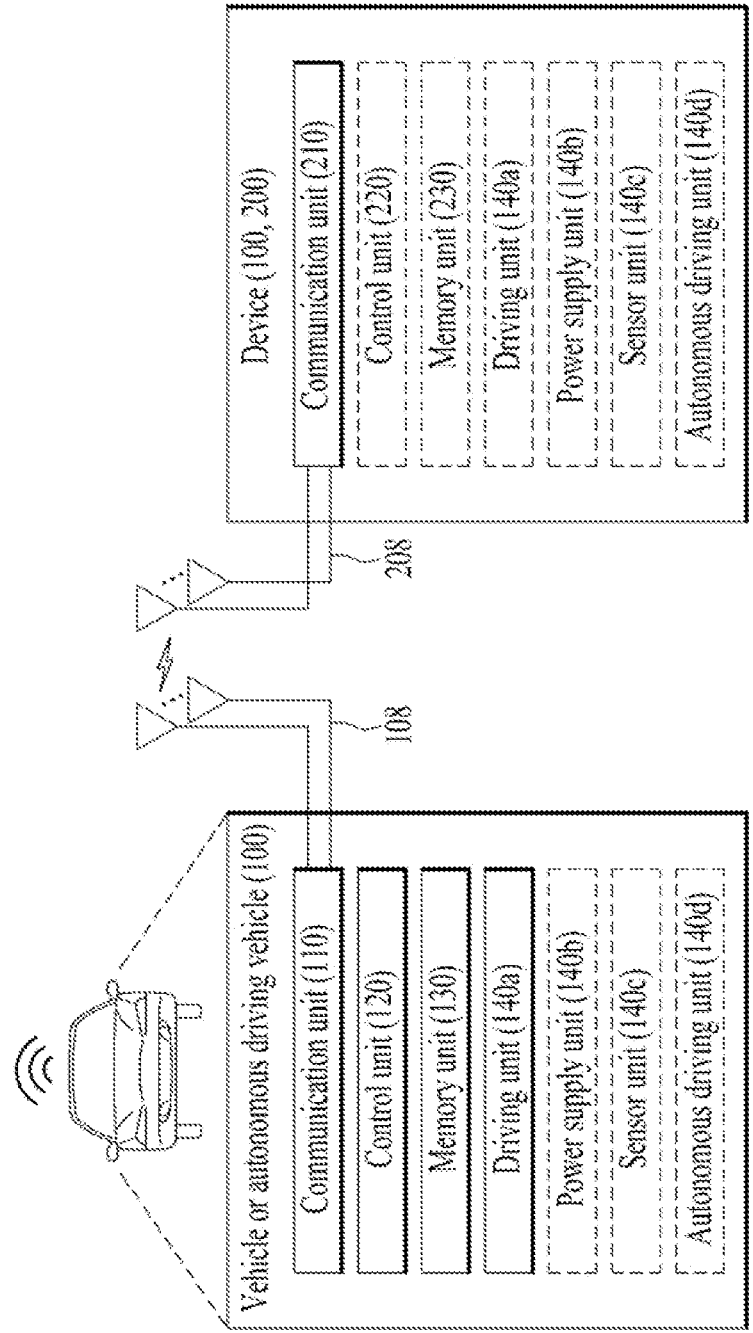

Example of a Vehicle or an Autonomous Driving Vehicle to Which the Present Disclosure is Applied FIG. 27 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 27, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to Which the Present Disclosure is Applied

Figure 28:
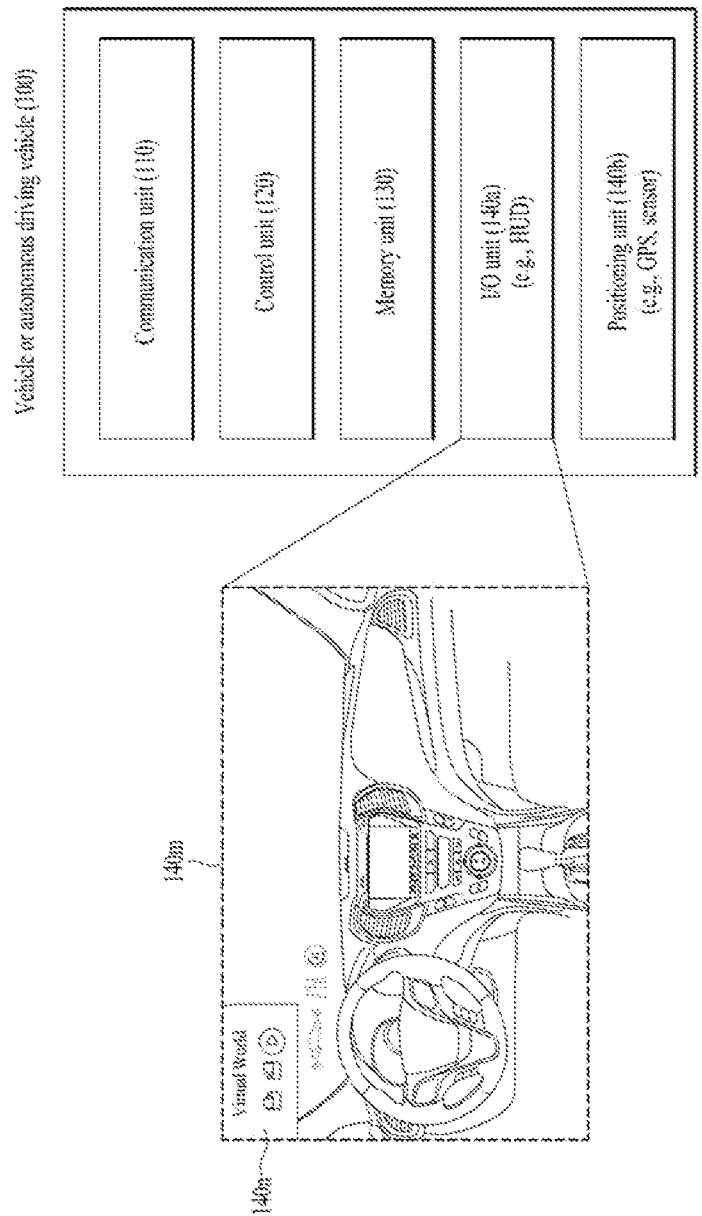

FIG. 28 illustrates a vehicle applied to the present disclosure. The vehicle may be implemented as a transport means, an aerial vehicle, a ship, etc.

Referring to FIG. 28, a vehicle 100 may include a communication unit 110, a control unit 120, a memory unit 130, an I/O unit 140*a*, and a positioning unit 140*b*.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of XR Device to Which the Present Disclosure is Applied

Figure 29:
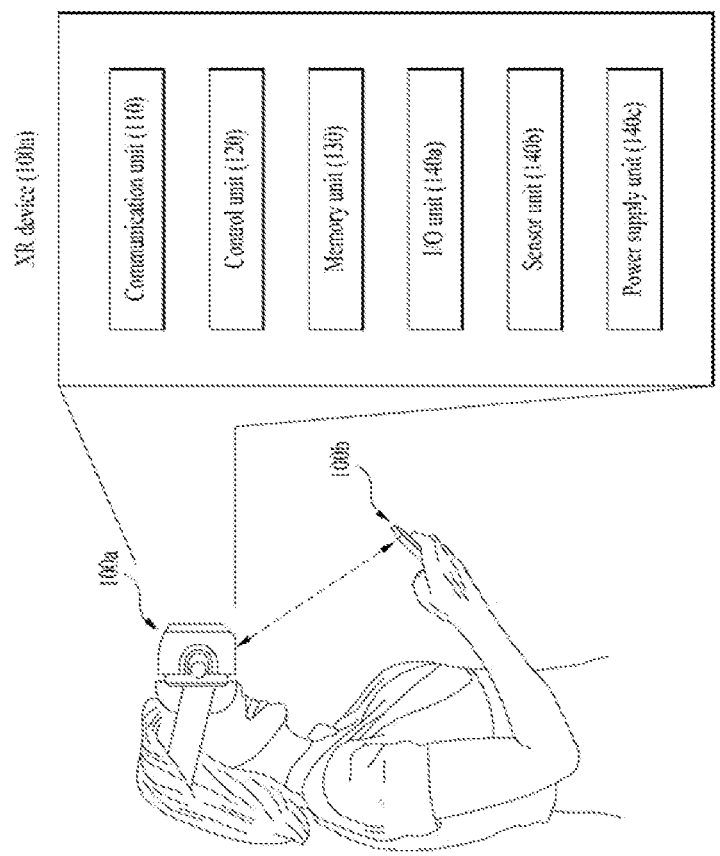

FIG. 29 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 29, an XR device 100a may include a communication unit 110, a control unit 120, a memory unit 130, an I/O unit 140a, a sensor unit 140b, and a power supply unit 140c.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of Robot to Which the Present Disclosure is Applied

FIG. 30 illustrates a robot applied to the present disclosure. The robot may be categorized into an industrial robot, a medical robot, a household robot, a military robot, etc., according to a used purpose or field.

Referring to FIG. 30, a robot 100 may include a communication unit 110, a control unit 120, a memory unit 130, an I/O unit 140a, a sensor unit 140b, and a driving unit 140c.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Examples of AI Device to Which the Present Disclosure is Applied

Figure 31:
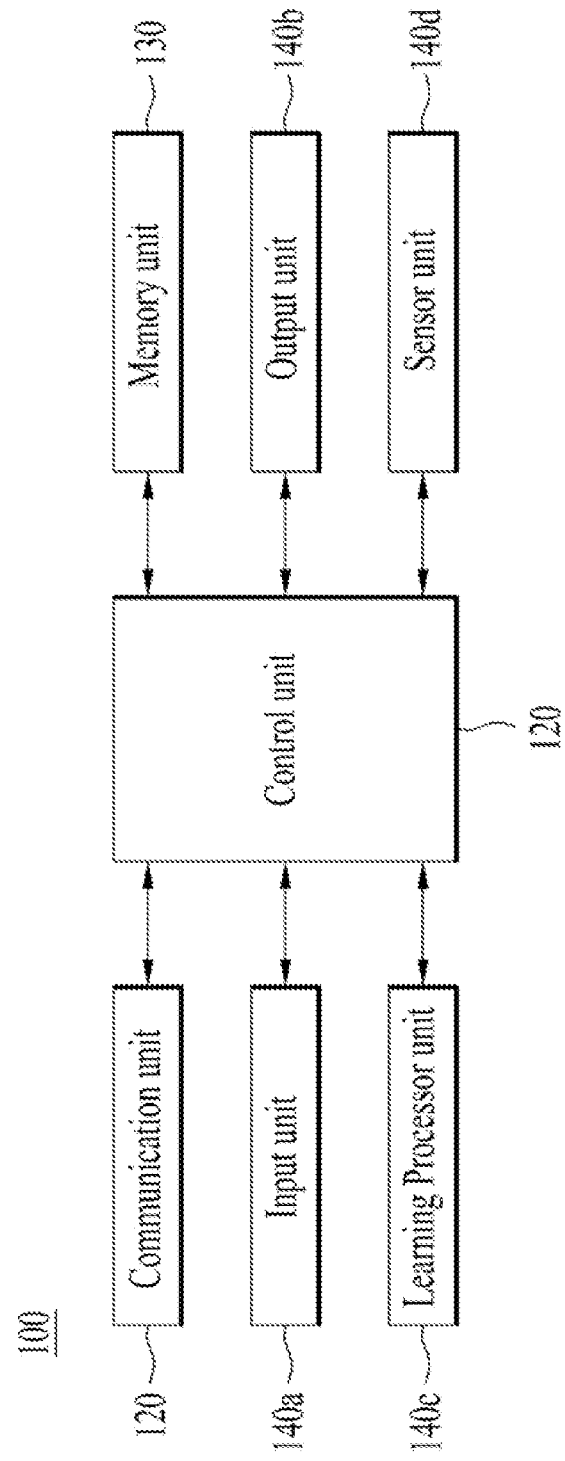

FIG. 31 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 31, an AI device 100 may include a communication unit 110, a control unit 120, a memory unit 130, an I/O unit 140a/140b, a learning processor unit 140c, and a sensor unit 140d.

The communication unit 110 may transmit and receive wired/radio signals (e.g., sensor information, user input, learning models, or control signals) to and from external devices such as other AI devices (e.g., 100x, 200, or 400 of FIG. 25) or an AI server (e.g., 400 of FIG. 25) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 25). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 25). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL APPLICABILITY

The above-described embodiments of the present disclosure are applicable to various mobile communication systems.

The invention claimed is:

1. A method of a first user equipment (UE) configured with a plurality of bandwidth parts (BWPs) related to different numerologies in a wireless communication system, the method comprising:
receiving discovery signals in at least two active BWPs among the plurality of BWPs, wherein the at least two active BWPs are activated simultaneously in a time domain;
selecting an active BWP among the at least two active BWPs based on reception times of the discovery signals and lengths of cyclic prefixes (CPs) of the discovery signals;
transmitting information related to the selected active BWP to a second UE; and
transmitting a control signal and a data signal to the second UE in the selected active BWP.

2. The method of claim 1, wherein the at least two active BWPs include a first BWP configured to be used only with a normal CP and a second BWP configured to be used only with an extended CP, and
wherein, based on the reception times of the discovery signals not being included in the length of the normal CP, the selected active BWP is the second BWP.

3. The method of claim 2, wherein based on the reception times of the discovery signals being included in the lengths of both of the normal CP and the extended CP, the selected active BWP is the first BWP.

4. The method of claim 1, wherein the selected active BWP is selected UE-specifically.

5. The method of claim 2, wherein information related to the selected active BWP is transmitted in the second BWP.

6. The method of claim 1, wherein the information related to the selected active BWP is transmitted in a BWP in which a discovery signal having one of a highest received signal strength indication (RSSI) measurement, a highest reference signal received power (RSRP) measurement, and a highest reference signal received quality (RSRQ) measurement has been transmitted, among the at least two active BWPs.

7. An apparatus for a first user equipment (UE) configured with a plurality of bandwidth parts (BWPs) related to different numerologies in a wireless communication system, the apparatus comprising:
at least one processor; and
at least one memory operably coupled to the at least one processor and storing at least one instruction which causes the at least one processor to perform operations,
wherein the operations include:
receiving a discovery signal in each of at least two active BWPs among the plurality of BWPs, wherein the at least two active BWPs are activated simultaneously in a time domain;
selecting an active BWP among the at least two active BWPs based on reception times of the discovery signals and lengths of cyclic prefixes (CPs) of the discovery signals;
transmitting information related to the selected active BWP to a second UE; and
transmitting a control signal and a sidelink data signal to the second UE in the selected active BWP.

8. The apparatus of claim 7, wherein the at least two active BWPs include a first BWP configured to be used only with a normal CP and a second BWP configured to be used only with an extended CP, and
wherein based on the reception times of the discovery signals not being included in the length of the normal CP, the selected active BWP is the second BWP.

9. The apparatus of claim 8, wherein based on the reception times of the discovery signals being included in the lengths of both of the normal CP and the extended CP, the selected active BWP is the first BWP.

10. The apparatus of claim 7, wherein the selected active BWP is selected UE-specifically.

11. The apparatus of claim 8, wherein information related to the selected active BWP is transmitted in the second BWP.

12. The apparatus of claim 7, wherein the UE is an autonomous driving vehicle or is included in an autonomous driving vehicle.

13. A processor for performing operations for a first user equipment (UE) configured with a plurality of bandwidth parts (BWPs) related to different numerologies in a wireless communication system, wherein the operations include:
receiving a discovery signal in each of at least two active BWPs among the plurality of BWPs, wherein the at least two active BWPs are activated simultaneously in a time domain;
selecting an active BWP among the at least two active BWPs based on reception times of the discovery signals and lengths of cyclic prefixes (CPs) of the discovery signals;
transmitting information related to the selected active BWP to a second UE; and
transmitting a control signal and a data signal to the second UE in the selected active BWP.

14. A non-transitory computer-readable storage medium storing at least one instruction which, when executed by at least one processor, causes the at least one processor to perform operations for a first user equipment (UE) configured with a plurality of bandwidth parts (BWPs) related to different numerologies, wherein the operations include:
receiving a discovery signal in each of at least two active BWPs among the plurality of BWPs, wherein the at least two active BWPs are activated simultaneously in a time domain;
selecting an active BWP among the at least two active BWPs based on reception times of the discovery signals and lengths of cyclic prefixes (CPs) of the discovery signals;
transmitting information related to the selected active BWP to a second UE; and
transmitting a control signal and a data signal to the second UE in the selected active BWP.

* * * * *